United States Patent
Porter et al.

(10) Patent No.: US 9,559,928 B1
(45) Date of Patent: Jan. 31, 2017

(54) INTEGRATED TEST COVERAGE MEASUREMENT IN DISTRIBUTED SYSTEMS

(71) Applicant: Amazon Technologies, Inc., Reno, NV (US)

(72) Inventors: Brandon William Porter, Yarrow Point, WA (US); Slavik Dimitrovich, Woodinville, WA (US); Anton Vladilenovich Goldberg, Bellevue, WA (US); Aram Grigoryan, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 294 days.

(21) Appl. No.: 13/886,488

(22) Filed: May 3, 2013

(51) Int. Cl.
*G06F 15/173* (2006.01)
*H04L 12/26* (2006.01)
*G06F 11/36* (2006.01)

(52) U.S. Cl.
CPC ....... *H04L 43/0876* (2013.01); *G06F 11/3612* (2013.01); *G06F 11/3624* (2013.01)

(58) Field of Classification Search
None
See application file for complete search history.

(56) References Cited

U.S. PATENT DOCUMENTS

| | | | |
|---|---|---|---|
| 5,809,121 A | 9/1998 | Elliott et al. | |
| 5,930,344 A | 7/1999 | Relyea et al. | |
| 6,701,345 B1 * | 3/2004 | Carley et al. | 709/205 |
| 6,792,460 B2 * | 9/2004 | Oulu et al. | 709/224 |
| 7,020,697 B1 * | 3/2006 | Goodman et al. | 709/223 |
| 7,058,843 B2 * | 6/2006 | Wolf | 714/4.5 |
| 7,139,999 B2 * | 11/2006 | Bowman-Amuah | 717/101 |
| 7,209,548 B2 | 4/2007 | Ethier et al. | |
| 7,272,752 B2 * | 9/2007 | Farchi et al. | 714/38.1 |
| 7,356,436 B2 * | 4/2008 | Bohizic et al. | 702/119 |
| 7,401,143 B2 * | 7/2008 | Oulu et al. | 709/224 |

(Continued)

FOREIGN PATENT DOCUMENTS

CN 102075381 A * 5/2011 ............. H04L 12/26

OTHER PUBLICATIONS

Banks et al., Software Testing by Statistical Methods—Preliminary Success Estimates for Approaches based on Binomial Models, Coverage Designs, Mutation Testing, and Usage Models, Mar. 12, 1998, National Institute of Standards and Technology.*

(Continued)

*Primary Examiner* — Yves Dalencourt
(74) *Attorney, Agent, or Firm* — Robert C. Kowert; Meyertons, Hood, Kivlin, Kowert & Goetzel, P.C.

(57) ABSTRACT

Methods and systems for implementing test coverage measurement are disclosed. A first set of interactions among a set of production services are determined. The first set of interactions comprises a plurality of service requests between individual ones of the set of production services. A second set of interactions among a set of test services are determined. The second set of interactions comprises a plurality of service requests between individual ones of the set of test services. A test coverage metric is generated. The test coverage metric indicates an amount of the first set of interactions that are covered by the second set of interactions.

21 Claims, 10 Drawing Sheets

(56) References Cited

U.S. PATENT DOCUMENTS

| | | | |
|---|---|---|---|
| 7,403,901 B1* | 7/2008 | Carley et al. | 705/2 |
| 7,437,614 B2* | 10/2008 | Haswell et al. | 714/38.13 |
| 7,467,198 B2* | 12/2008 | Goodman et al. | 709/223 |
| 7,496,799 B2 | 2/2009 | Prang et al. | |
| 7,552,212 B2* | 6/2009 | Chagoly et al. | 709/224 |
| 7,809,525 B2* | 10/2010 | Chagoly et al. | 702/182 |
| 7,822,844 B2* | 10/2010 | Oulu et al. | 709/224 |
| 7,836,296 B2* | 11/2010 | Cox et al. | 713/154 |
| 7,900,183 B2* | 3/2011 | Bhinge | 716/136 |
| 7,904,270 B2* | 3/2011 | Bohizic et al. | 702/119 |
| 7,917,326 B2* | 3/2011 | Bohizic et al. | 702/119 |
| 7,925,747 B2* | 4/2011 | Kirwan et al. | 709/224 |
| 8,015,294 B2* | 9/2011 | Bugenhagen et al. | 709/227 |
| 8,140,596 B2* | 3/2012 | Brown et al. | 707/810 |
| 8,159,491 B2* | 4/2012 | Capewell et al. | 345/426 |
| 8,161,449 B2* | 4/2012 | Bhinge et al. | 716/136 |
| 8,224,959 B2* | 7/2012 | Kirwan et al. | 709/224 |
| 8,326,965 B2* | 12/2012 | Grumann et al. | 709/224 |
| 8,352,428 B2* | 1/2013 | Wood et al. | 707/638 |
| 8,463,894 B2* | 6/2013 | Chen | 709/224 |
| 8,490,046 B2* | 7/2013 | Bhinge | 716/136 |
| 8,504,994 B2* | 8/2013 | Golender et al. | 717/128 |
| 8,510,430 B2* | 8/2013 | McKinney | 709/224 |
| 8,537,695 B2* | 9/2013 | Wiley et al. | 370/252 |
| 8,566,702 B2* | 10/2013 | Sherkin | 715/234 |
| 8,576,722 B2* | 11/2013 | Bugenhagen | 370/241 |
| 8,601,441 B2* | 12/2013 | Kaulgud et al. | 717/124 |
| 8,607,198 B2* | 12/2013 | Nir-Buchbinder et al. | 717/124 |
| 8,635,617 B2* | 1/2014 | Adler | 718/100 |
| 8,666,723 B2* | 3/2014 | Xie et al. | 703/14 |
| 8,696,450 B2* | 4/2014 | Rose et al. | 463/30 |
| 8,806,619 B2* | 8/2014 | Lomont et al. | 726/22 |
| 8,855,141 B2* | 10/2014 | Filipescu et al. | 370/468 |
| 8,855,757 B2* | 10/2014 | Kapoor | 600/523 |
| 8,875,158 B2* | 10/2014 | Zhang et al. | 719/318 |
| 8,898,641 B2* | 11/2014 | Adams et al. | 717/124 |
| 8,898,647 B2* | 11/2014 | Sobolev et al. | 717/130 |
| 8,930,758 B2* | 1/2015 | Budnik et al. | 714/27 |
| 2002/0159641 A1* | 10/2002 | Whitney et al. | 382/219 |
| 2004/0064293 A1* | 4/2004 | Hamilton et al. | 702/182 |
| 2004/0088386 A1* | 5/2004 | Aggarwal | 709/220 |
| 2004/0088403 A1* | 5/2004 | Aggarwal | 709/224 |
| 2004/0088404 A1* | 5/2004 | Aggarwal | 709/224 |
| 2004/0088405 A1* | 5/2004 | Aggarwal | 709/224 |
| 2004/0181694 A1* | 9/2004 | Cox et al. | 713/201 |
| 2004/0215762 A1* | 10/2004 | Oulu et al. | 709/223 |
| 2004/0215768 A1* | 10/2004 | Oulu et al. | 709/224 |
| 2004/0243662 A1* | 12/2004 | Mastro | 709/200 |
| 2005/0193269 A1* | 9/2005 | Haswell et al. | 714/38 |
| 2006/0005083 A1* | 1/2006 | Genden et al. | 714/47 |
| 2006/0005180 A1* | 1/2006 | Nefian et al. | 717/158 |
| 2006/0059253 A1* | 3/2006 | Goodman et al. | 709/223 |
| 2006/0174174 A1* | 8/2006 | Bohizic et al. | 714/724 |
| 2006/0184669 A1* | 8/2006 | Vaidyanathan et al. | 709/224 |
| 2007/0006041 A1* | 1/2007 | Brunswig et al. | 714/38 |
| 2007/0094060 A1* | 4/2007 | Apps et al. | 705/7 |
| 2007/0244650 A1* | 10/2007 | Gauthier | G06Q 10/10 702/19 |
| 2008/0034082 A1* | 2/2008 | McKinney | 709/224 |
| 2008/0141080 A1* | 6/2008 | Bohizic et al. | 714/701 |
| 2008/0141084 A1* | 6/2008 | Bohizic et al. | 714/724 |
| 2008/0307088 A1* | 12/2008 | Chen | 709/224 |
| 2009/0019427 A1* | 1/2009 | Li et al. | 717/126 |
| 2009/0019428 A1* | 1/2009 | Li et al. | 717/128 |
| 2009/0183143 A1* | 7/2009 | Li et al. | 717/126 |
| 2009/0228587 A1* | 9/2009 | Chagoly et al. | 709/224 |
| 2009/0313639 A1* | 12/2009 | Davis et al. | 719/317 |
| 2010/0131930 A1* | 5/2010 | Ben-Chaim et al. | 717/127 |
| 2010/0262866 A1* | 10/2010 | Nir-Buchbinder et al. | 714/38 |
| 2010/0318970 A1* | 12/2010 | Grechanik et al. | 717/124 |
| 2011/0093514 A1* | 4/2011 | Brown et al. | 707/810 |
| 2011/0191471 A1* | 8/2011 | Rachitsky et al. | 709/224 |
| 2011/0289578 A1* | 11/2011 | Bugenhagen et al. | 726/11 |
| 2012/0017195 A1* | 1/2012 | Kaulgud et al. | 717/101 |
| 2012/0084779 A1* | 4/2012 | Adler | 718/100 |
| 2012/0266185 A1* | 10/2012 | Davis et al. | 719/317 |
| 2012/0284402 A1* | 11/2012 | Kirwan et al. | 709/224 |
| 2012/0296689 A1* | 11/2012 | Wewalaarachchi et al. | 705/7.26 |
| 2013/0080996 A1* | 3/2013 | Allam et al. | 717/120 |
| 2013/0152047 A1* | 6/2013 | Moorthi | G06F 11/368 717/124 |
| 2013/0166311 A1* | 6/2013 | Stock et al. | 705/2 |
| 2013/0166966 A1* | 6/2013 | Keum et al. | 714/48 |
| 2013/0185729 A1* | 7/2013 | Vasic et al. | 718/104 |
| 2013/0198387 A1* | 8/2013 | Swildens et al. | 709/226 |
| 2013/0219057 A1* | 8/2013 | Li et al. | 709/224 |
| 2013/0219372 A1* | 8/2013 | Li et al. | 717/128 |
| 2013/0227529 A1* | 8/2013 | Li et al. | 717/128 |
| 2013/0227536 A1* | 8/2013 | Li et al. | 717/154 |
| 2013/0311976 A1* | 11/2013 | Bhat et al. | 717/130 |
| 2013/0322432 A1* | 12/2013 | Wiley et al. | 370/352 |
| 2013/0326055 A1* | 12/2013 | Chatterjee et al. | 709/224 |
| 2013/0339933 A1* | 12/2013 | Walters | G06F 8/70 717/131 |
| 2014/0043999 A1* | 2/2014 | Bugenhagen | 370/252 |
| 2014/0053025 A1* | 2/2014 | Marvasti et al. | 714/37 |
| 2014/0109112 A1* | 4/2014 | Zhang et al. | 719/318 |
| 2014/0201703 A1* | 7/2014 | Boden et al. | 717/101 |
| 2014/0215620 A1* | 7/2014 | Hayrynen | H04L 63/1416 726/23 |
| 2014/0235179 A1* | 8/2014 | George | H04W 24/08 455/67.14 |
| 2014/0245069 A1* | 8/2014 | Hu et al. | 714/38.1 |
| 2014/0380279 A1* | 12/2014 | Bartley et al. | 717/124 |
| 2015/0007148 A1* | 1/2015 | Bartley et al. | 717/131 |
| 2015/0020053 A1* | 1/2015 | Boden et al. | 717/124 |
| 2015/0020072 A1* | 1/2015 | Boden et al. | 718/1 |
| 2015/0178182 A1* | 6/2015 | Mallya | G06F 11/3672 717/124 |

OTHER PUBLICATIONS

Lee et al., Visualization and Analysis of Clickstream Data of Online Stores for Understanding Web Merchandising, 2001, Kluwer Acedemic Publishers, Data Mining and Knowledge Discovery, 5, 59-84, 2001.*

Menasalvas et al., Subsessions: a granular approach to click path analysis, 2002, IEEE, 0-7803-7280-8/02.*

OASIS, Web Services Business Process Execution Language Version 2.0, Apr. 11, 2007, OASIS Standard.*

Benjamin H. Sigelman, Luiz Andre Barroso, Mike Burrows, Pat Stephenson, Manoj Plakal, Donald Beaver, Saul Jaspan, and Chandan Shanbhag, "Dapper, a Large-Scale Distributed Systems Tracing Infrastructure," Google Technical Report dapper-2010-1, Apr. 2010. pp. 1-14.

Rodrigo Fonseca, George Porter, Randy H. Katz, Scott Shenker, and Ion Stoica, "X-Trace: A Pervasive Network Tracing Framework," 4th USENIX Symposium on Networked Systems Design & Implementation (NSDI'07), Apr. 2007. pp. 1-14.

\* cited by examiner

INTEGRATED TEST COVERAGE MEASUREMENT IN DISTRIBUTED SYSTEMS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail pages (e.g., a web page) that specifies various information about the item, such as a description of the item, one or more pictures of the item, as well as specifications (e.g., weight, dimensions, capabilities) of the item. In various cases, such network-based marketplaces may rely on a service-oriented architecture to implement various business processes and other tasks. The service-oriented architecture may be implemented using a distributed system that includes many different computing resources and many different services that interact with one another, e.g., to produce a product detail page for consumption by a client of a web server.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for providing integrated test coverage measurement are described. Using the systems and methods described herein, interactions between services (e.g., call paths) in a production environment may be monitored over a period of time. Similarly, interactions between services (e.g., call paths) in a test environment may be monitored over a period of time. The interactions in the production environment may be compared to the interactions in the test environment. Based on the comparison, a metric and/or report may be generated to indicate the degree to which the test interactions cover the production interactions.

Figure 1:
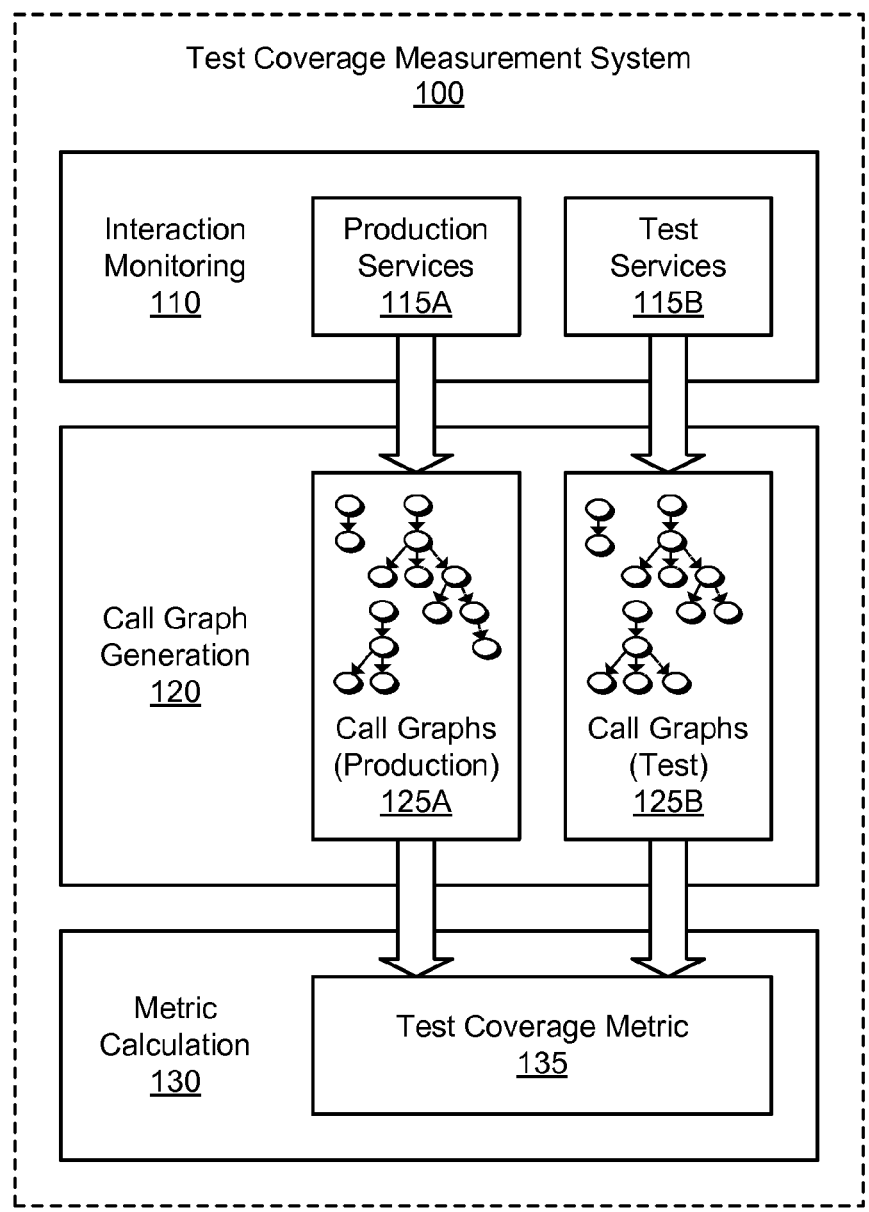
FIG. 1 illustrates an example system environment for integrated test coverage measurement, according to some embodiments.

FIG. 1 illustrates an example system environment for integrated test coverage measurement, according to one embodiment. The example system environment may include a test coverage measurement system 100. The test coverage measurement system 100 may include a plurality of components for monitoring interactions between services and generating metrics and/or other information based on the monitored interactions. For example, the test coverage measurement system 100 may include interaction monitoring functionality 110, call graph generation functionality 120, and metric calculation functionality 130.

Figure 11:
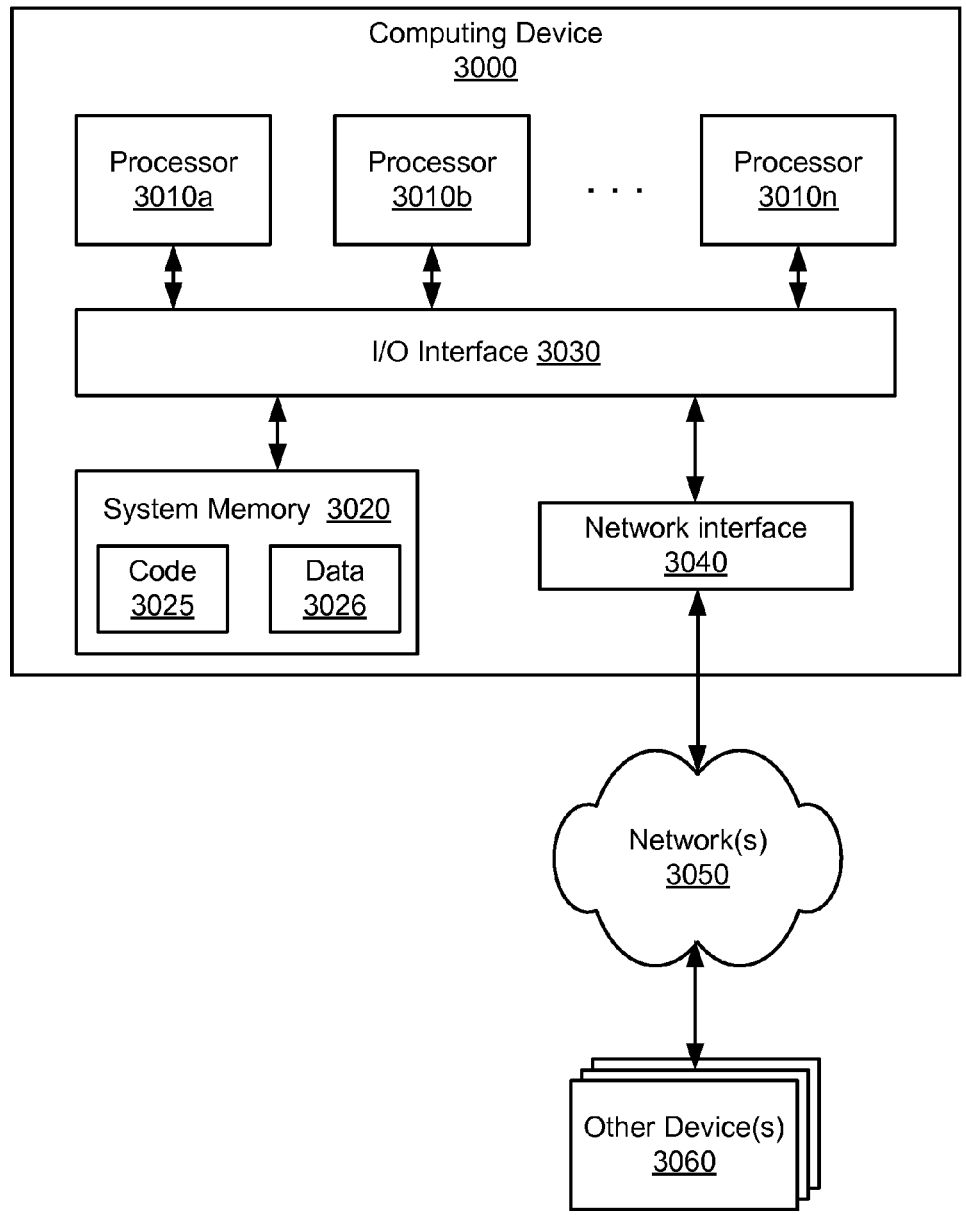
FIG. 11 illustrates an example of a computing device that may be used in some embodiments.

The test coverage measurement system 100 may comprise one or more computing devices, any of which may be implemented by the example computing device 3000 illustrated in FIG. 11. In various embodiments, the functionality of the different services, components, and/or modules of the test coverage measurement system 100 (e.g., interaction monitoring functionality 110, call graph generation functionality 120, and metric calculation functionality 130) may be provided by the same computing device or by different computing devices. If any of the various components are implemented using different computing devices, then the respective computing devices may be communicatively coupled, e.g., via a network. Each of the interaction monitoring functionality 110, call graph generation functionality 120, and metric calculation functionality 130 may represent any combination of software and hardware usable to perform their respective functions, as discussed as follows.

The interaction monitoring functionality 110 may monitor or track interactions between services in a service-oriented system, such as a system structured according to a service-oriented architecture (SOA). A service-oriented architecture may include multiple services configured to communicate with each other (e.g., through message passing) to carry out various tasks, such as business process functions. The services may be distributed across multiple computing instances and/or multiple subsystems which are connected, e.g., via one or more networks. In some embodiments, such services may be loosely coupled in order to minimize (or in some cases eliminate) interdependencies among services. This modularity may enable services to be reused in order to build various applications through a process referred to as orchestration.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services.

In one embodiment, the interaction monitoring functionality 110 may monitor interactions between services in a production environment and also in a test environment. The production environment may be a "real-world" environment in which a set of production services 115A are invoked, either directly or indirectly, by interactions with a real-world client, consumer, or customers, e.g., of an online merchant or provider of web-based services. In one embodiment, the test environment may be an environment in which a set of test services 115B are invoked in order to test their functionality. The test environment may be isolated from real-world clients, consumers, or customers of an online merchant or provider of web-based services. In one embodiment, the test environment may be implemented by configuring suitable elements of computing hardware and software in a manner designed to mimic the functionality of the production environment. Accordingly, at least some of the individual test services may correspond to individual production services. In one embodiment, the test environment may temporarily borrow resources from the production environment. In one embodiment, the test environment may be configured to shadow the production environment, such that individual test services represent shadow instances of corresponding production services. When the production environment is run in shadow mode, copies of requests generated by production services may be forwarded corresponding to shadow instances in the test environment to execute the same transactions.

To monitor the interactions between production services 115A and the interactions between test services 115B, lightweight instrumentation may be added to the services 115A and 115B. The instrumentation (e.g., a reporting agent associated with each service) may collect and report data associated with each inbound request, outbound request, or other service interaction (e.g., a timer-based interaction) processed by a service. Further aspects of the service instrumentation, interaction monitoring functionality 110, and call graph generation functionality 120 are discussed below with respect to FIGS. 5-10.

Turning back to FIG. 1, the call graph generation functionality 120 may generate and store data indicative of a hierarchy of call pathways between services. The call pathways may represent inbound service requests and outbound service requests relative to a particular service. To process a given received request, the system described herein may invoke one or more of the types of services described above. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph that specifies, for each particular service of multiple services called to fulfill the same root request, the service that called the particular service and any services called by the particular service. For instance, a call graph may in some cases be a deep and broad tree with multiple branches each representing a series of related service calls. The call graph generation functionality 120 may use any suitable data and metadata to build the call graphs, such as request identifiers and metadata associated with services and their interactions. The request identifiers and metadata are discussed below with respect to FIGS. 5-10.

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that interdependencies among source and/or machine code are not present).

As shown in FIG. 1, a plurality of call graphs 125A may be generated for the production services 115A. Each of the call graphs 125A may be a hierarchical data structure representing a plurality of call paths between individual production services over a period of time. For example, the call graphs 125A may be generated based on monitoring of the production services 115A for a sufficient length of time (e.g., longer than a month) to capture rare call paths. A plurality of call graphs 125B may also be generated for the test services 115B. Each of the call graphs 125B may be a hierarchical data structure representing a plurality of call paths between individual test services over a period of time. The period of time represented by the test call graphs 125B may differ from the period of time represented by the production call graphs 125A. For example, the period of time represented by the test call graphs 125B may be shorter than the period of time represented by the production call graphs 125A.

In various embodiments, the test services 115B may be invoked on any suitable basis to generate the call graphs 125B. In one embodiment, the test services 115B may be executed based on a set of synthetic, machine-generated requests that are intended to mimic real-world traffic. In one embodiment, the test services 115B may be executed based on a subset of real-world traffic, e.g., a subset of requests captured by monitoring the production services 115A over a period of time. If the configuration of the test services 115B differs from the configuration of the production services 115A, then the same set of initial requests or traffic may yield a different call graph for the test environment than for the production environment. The configuration of the test services 115B may differ if more services are included, if fewer services are included, and/or if the parent-child relationship between any of the services varies from the production environment to the test environment.

The metric calculation functionality 130 may compare the production call graphs 125A to the test call graphs 125B and generate one or more metrics based on the comparison. In one embodiment, the metric calculation functionality 130 may generate a test coverage metric 135. The test coverage metric 135 may indicate an amount, such as a percentage, of the call paths or other interactions in the production call graphs 125A that are represented by corresponding call paths or other interactions in the test call graphs 125B. In other words, the test coverage metric 135 may indicate the degree to which the test interactions cover the production interactions.

Any suitable technique may be used to generate the test coverage metric 135. In one embodiment, for example, the metric calculation functionality 130 may walk both sets of call graphs to establish a correspondence between the nodes (e.g., services) and edges (e.g., calls) of the two sets of call graphs. In one embodiment, a hash may be computed for each production path and each test path, and a hash for the corresponding test path may be compared to the hash for the production path. The test coverage metric 135 may be reported to one or more users with any suitable reporting or notification techniques. In one embodiment, the test coverage metric 135 may be reported to the same user(s) who initiated a test coverage measurement process including interaction monitoring, call graph generation, and metric calculation.

Accordingly, the test coverage metric 135 may measure the "completeness" of a set of tests relative to the real-world operation of a distributed, service-oriented system. If the test coverage metric is sufficiently high, and if the performance of the tested system is also sufficient, then a user may choose to deploy the tested configuration into production under the assumption that it will continue to perform well. By generating the test coverage metric 135 once and then running new tests, the test coverage metric 135 may be used to measure how well the introduction of new tests improves the test coverage. By generating the test coverage metric 135 once, modifying the configuration of the test services 115B, and then running additional tests, the test coverage metric 135 may also be used to measure how well the configuration change improves the test coverage.

Figure 2:
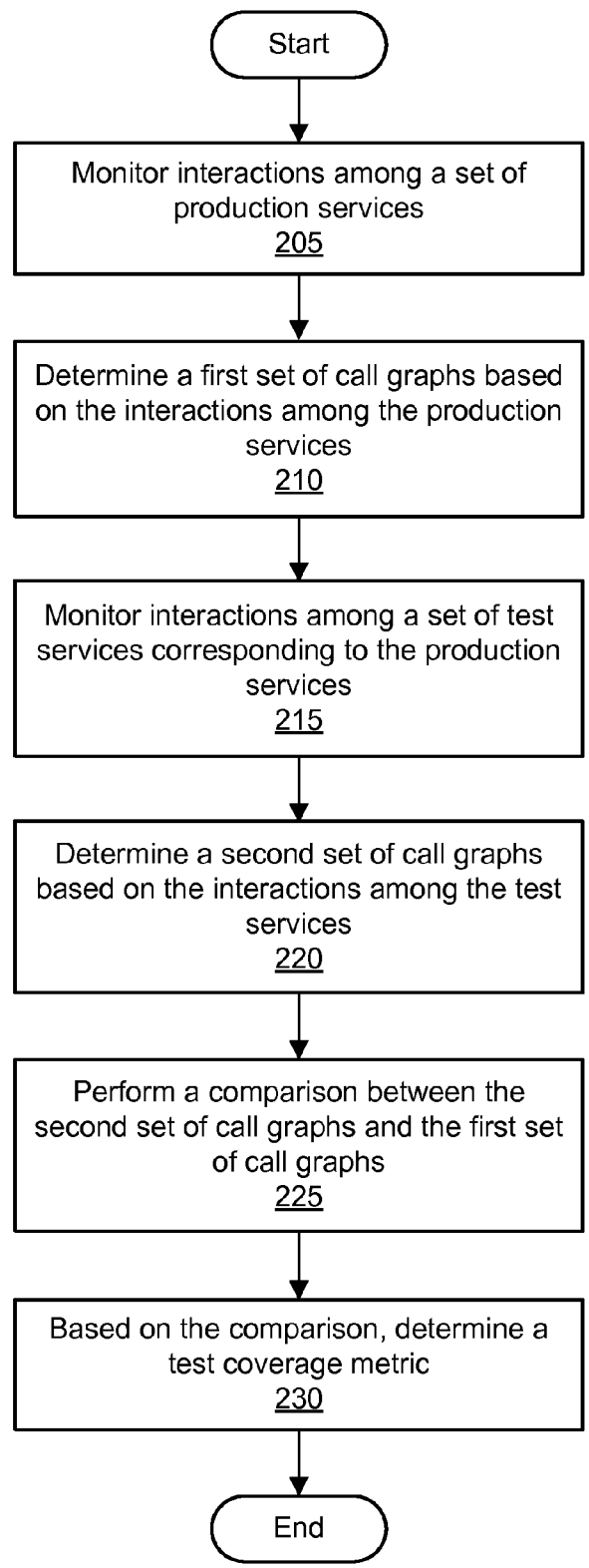
FIG. 2 is a flowchart illustrating a method for implementing integrated test coverage measurement, according to some embodiments.

FIG. 2 is a flowchart illustrating a method for implementing integrated test coverage measurement, according to one embodiment. As shown in 205, a plurality of interactions among a set of production services may be monitored in a production environment over a period of time. In one embodiment, the interactions among the set of production services may be monitored by tracking service requests using a respective reporting agent for each of the production services. For example, the service requests may include one or more inbound service requests, one or more outbound service requests, and/or one or more other service interactions.

As shown in 210, a first set of call graphs may be determined based on the interactions among the set of production services. The first set of call graphs may include a plurality of call paths between individual ones of the set of production services. The first set of call graphs may be stored as one or more data structures representing the production services and the call paths between the production services.

As shown in 215, a plurality of interactions among a set of test services in a test environment may be monitored over a period of time. In one embodiment, the set of test services may generally correspond to the set of production services. The period of time for monitoring the test services may differ from the period of time for monitoring the production services. In one embodiment, the interactions among the set of test services may be monitored by tracking service requests using a respective reporting agent for each of the test services. For example, the service requests may include one or more inbound service requests, one or more outbound service requests, and/or one or more other service interactions.

As shown in 220, a second set of call graphs may be determined based on the interactions among the set of test services. The second set of call graphs may include a plurality of call paths between individual ones of the set of test services. The second set of call graphs may be stored as one or more data structures representing the test services and the call paths between the test services.

As shown in 225, a comparison may be performed between the second set of call graphs and the first set of call graphs. The comparison may determine differences and similarities with respect to the nodes and edges of the two sets of call graphs. As shown in 230, based on the comparison, a test coverage metric may be determined. The test coverage metric may indicate a percentage of the call paths in the first set of call graphs that are included in the second set of call graphs. Based on the sets of call graphs and the comparison, a report may also be generated to indicate further differences between the production environment and the test environment.

In one embodiment, the first set of call graphs may include a first plurality of clusters, and the second set of call graphs may include a second plurality of clusters. Each of the clusters may include a plurality of related call paths representing different scenarios. In one embodiment, the test coverage metric may indicate a percentage of the clusters in the first set of call graphs that are included in the second set of call graphs.

Figure 3:
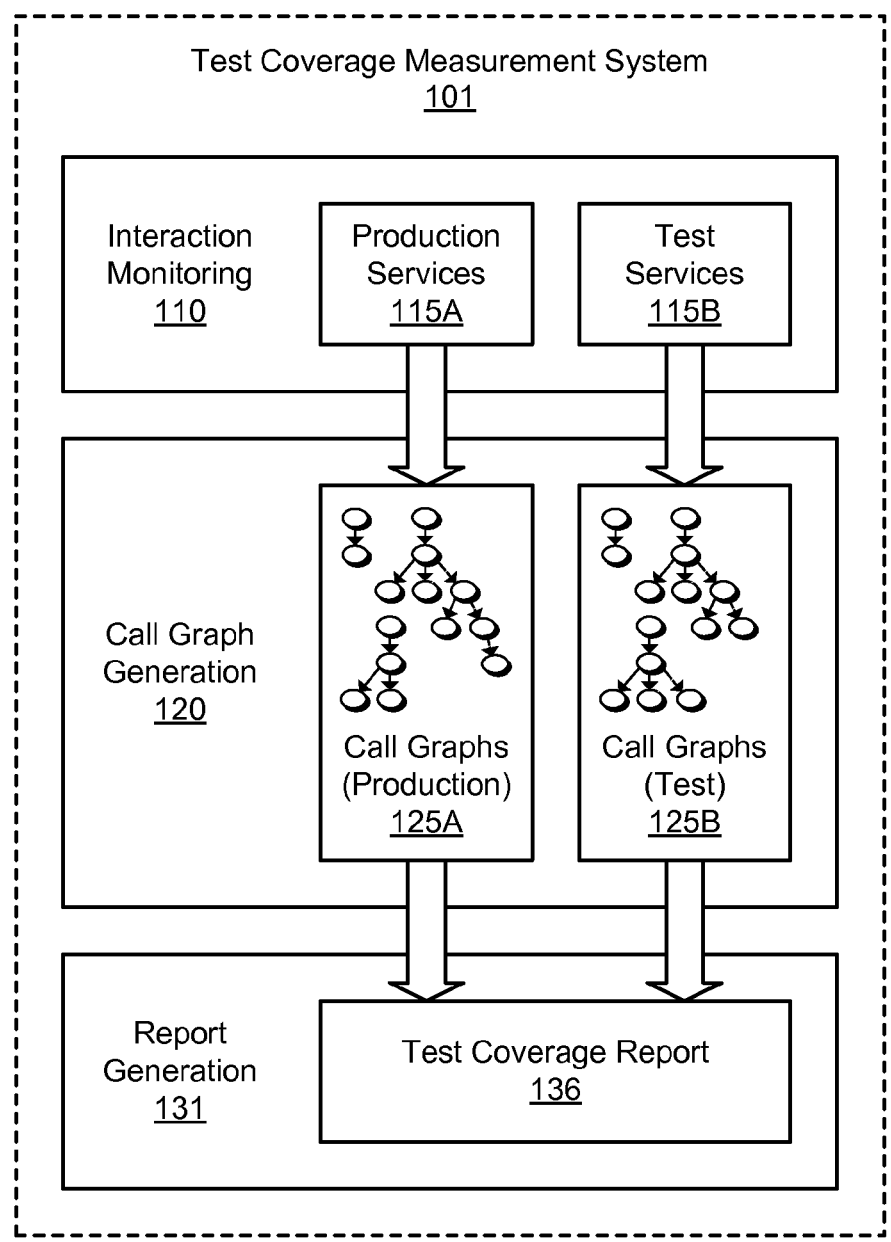
FIG. 3 illustrates further aspects of an example system environment for integrated test coverage measurement, according to some embodiments.

FIG. 3 illustrates further aspects of an example system environment for integrated test coverage measurement, according to one embodiment. The example system environment may include a test coverage measurement system 101. The test coverage measurement system 101 may include a plurality of components for monitoring interactions between services and generating reports and/or other information based on the monitored interactions. For example, the test coverage measurement system 101 may include interaction monitoring functionality 110, call graph generation functionality 120, and report generation functionality 131.

The test coverage measurement system 101 may comprise one or more computing devices, any of which may be implemented by the example computing device 3000 illustrated in FIG. 11. In various embodiments, the functionality of the different services, components, and/or modules of the test coverage measurement system 101 (e.g., interaction monitoring functionality 110, call graph generation functionality 120, and report generation functionality 131) may be provided by the same computing device or by different computing devices. If any of the various components are implemented using different computing devices, then the respective computing devices may be communicatively coupled, e.g., via a network. Each of the interaction monitoring functionality 110, call graph generation functionality 120, and report generation functionality 131 may represent any combination of software and hardware usable to perform their respective functions.

In various embodiments, the report generation functionality 131 may generate a test coverage report 136 indicating various different types of information about the monitored interactions, the call graphs 125A and 125B, and any other information indicative of differences between the production environment and the test environment. In one embodiment, related call paths may be clustered into scenarios. Test coverage may then be measured and reported on a scenario-by-scenario basis instead of or in addition to a path-by-path basis. In one embodiment, therefore, the test coverage metric 135 and/or test coverage report 136 may indicate the degree to which the different scenarios in the production traffic are covered by the corresponding scenarios in the test traffic.

In one embodiment, scenarios may be identified based on the similarity of the edit distance of their corresponding graphs. For example, a service that calls ten services that each call ten services may have 10^10 potential call paths. By progressively clustering, these 10^10 paths may be identified as part of one call pattern or scenario In one embodiment, a string may represent the call path in linear form. Using any suitable heuristics, the strings may be compared for their edit distance. If the edit distance is sufficiently small (i.e., relative to some threshold), then the corresponding call paths may be clustered together into the same scenario. If one call path is a subset of another and brings no new information to a call graph, then that call path may be clustered. In this manner, the clustering of production call paths into scenarios may simply the testing burden. Instead of measuring coverage on a path-to-path basis, coverage may be measured on a scenario-to-scenario basis. The report 136 may be two-tiered to indicate the percentage of scenarios covered and the percentage of call paths covered within each scenario.

In one embodiment, a probability of the call path occurring may be determined for each of the call paths in the production environment and also in the test environment. In one embodiment, the test coverage report 136 may indicate the probability of a particular call path occurring in production in comparison to the probability of the same call path occurring in testing. Any substantial differences in probability may be flagged in the report 136. In addition to reporting the coverage of call paths in testing, the report 136 may include the percentage of production traffic covered by the call paths in testing. For example, the report 136 may indicate that the tests covered 50% of the call paths but covered 95% of the actual production scenarios because those covered call paths are responsible for 95% of the production traffic.

The report 136 may include a frequency distribution and/or probability distribution relating to the production environment and/or test environment. In one embodiment, the report 136 may indicate the frequency of particular interactions in the production environment and/or in the test environment. The report 136 may flag any differences in frequency between the production environment and the test environment, e.g., if the difference in frequency is greater than a predefined threshold. In one embodiment, the report 136 may indicate the probability of the occurrence of particular interactions in the production environment and/or in the test environment. The report 136 may flag any differences in probability between the production environment and the test environment, e.g., if the difference in probability is greater than a predefined threshold.

The report 136 may include multiple test coverage metrics. The report 136 may also include path-by-path results expressed in a tabular format. For example, the report 136 may include a table, where each row in the table represents data for a particular call path. In the example shown below, the first column represents the call path identifier of each particular call path, the second column represents the number of occurrences of the call path in the first environment (e.g., a production environment), the third column represents the number of occurrences of the call path in the second environment (e.g., a test environment), the fourth column is a Boolean value indicating whether the call path was covered by (i.e., present in) the second environment, and the fifth column indicates the number of occurrences of the path in the first environment that are also covered by the second environment:

| | | | | | |
|---|---|---|---|---|---|
| 1. | path-8923423 | 982 | 0 | FALSE | 0 |
| 2. | path-8716212 | 376 | 0 | FALSE | 0 |
| 3. | path-4362723 | 290 | 1 | TRUE | 290 |
| 4. | path-1769823 | 110 | 1 | TRUE | 110 |
| 5. | path-2389472 | 52 | 1 | TRUE | 52 |
| 6. | path-2129832 | 8 | 1 | TRUE | 8 |
| 7. | path-2934793 | 1 | 1 | TRUE | 1 |
| TOTALS: | 7 | 1819 | 13 | 5 | 461 |

Based on the data in this example, the report 136 may include two or more test coverage metrics. In this example, a first metric may be a percentage representing the coverage of paths by the second environment (i.e., unique paths with at least one occurrence in the second environment/total paths): 5/7=71.4%. Additionally, a second metric may be a percentage representing the frequency of occurrences in the first environment that are covered by the second environment: 461/1819=25.3%.

In one embodiment, the report 136 may indicate specific call paths or other interactions in the production call graphs 125A that are covered in the test call graphs 125B. In one embodiment, the report 136 may indicate specific call paths or other interactions in the production call graphs 125A that are not covered in the test call graphs 125B. For example, if 1200 different upstream call paths that invoked a payment and 82 different downstream call paths that the payment invoked are identified in production traffic, then the report 136 may indicate that the tests covered 982 of the 1200 upstream call paths and 72 of the 82 downstream call paths. The report 136 may indicate the percentages of the downstream call paths, the upstream call paths, and/or the total call paths covered in the tests. The report 136 may also indicate which call paths from the production traffic were not encountered in the tests. In one embodiment, the report 136 may provide examples of when the call paths not encountered in testing were encountered in production. If a new release under testing is actually intended to eliminate the call paths that were not covered in testing, then the report 136 may permit verification of their elimination.

In some cases, services in the production environment may have side effects that would be undesirable in the test environment. For example, a service that secures payment for a transaction from a credit card provider may be disabled from communicating with the credit card provider in the test environment. Although this service request may be made in the production environment but not in the test environment, the report 136 may be used to gain transparency into the lack of coverage in this case. By reporting the call paths that are invoked in production but not in the test scenario, or vice versa, the report generation functionality 131 may give the user the ability to identify differences between the two environments.

Figure 4:
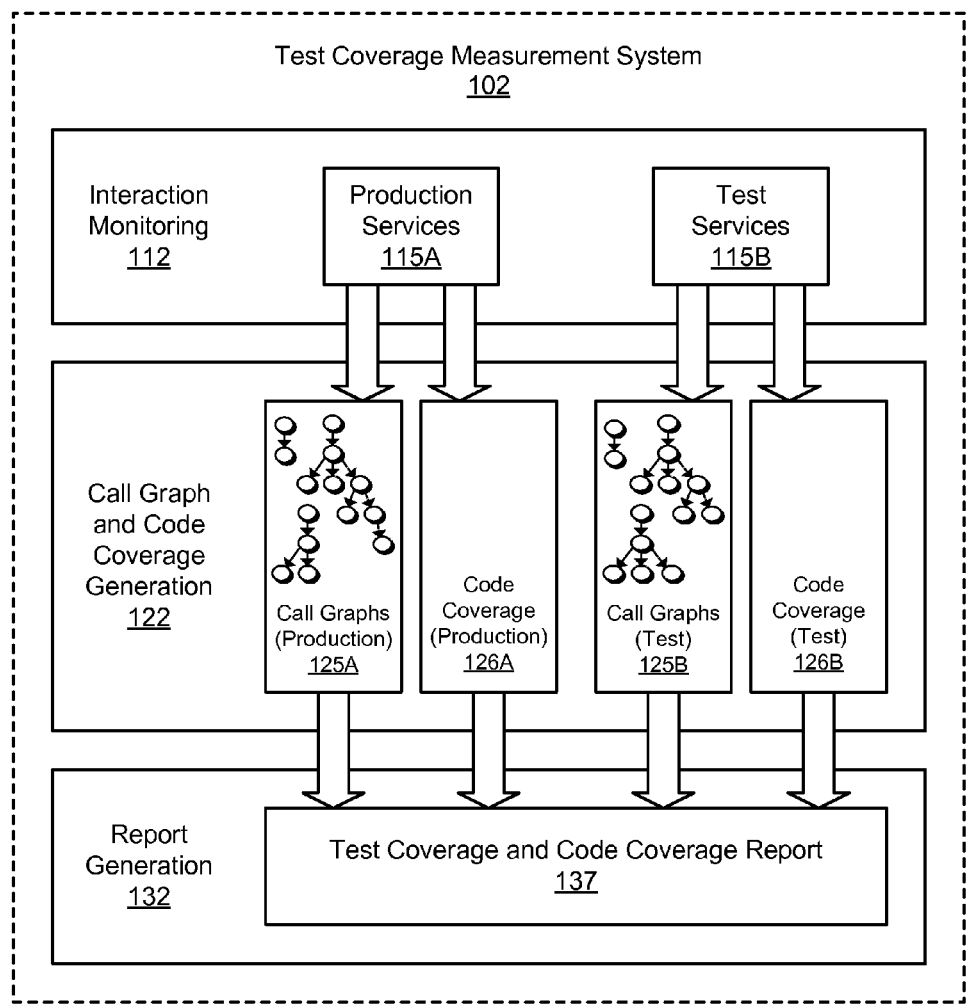
FIG. 4 illustrates an example system environment for integrated test coverage and code coverage measurement, according to some embodiments.

FIG. 4 illustrates an example system environment for integrated test coverage and code coverage measurement, according to one embodiment. The example system environment may include a test coverage measurement system 102. The test coverage measurement system 102 may include a plurality of components for monitoring interactions between services and generating reports and/or other information based on the monitored interactions. For example, the test coverage measurement system 102 may include interaction monitoring functionality 112, call graph and code coverage generation functionality 122, and report generation functionality 132.

The test coverage measurement system 102 may comprise one or more computing devices, any of which may be implemented by the example computing device 3000 illustrated in FIG. 11. In various embodiments, the functionality of the different services, components, and/or modules of the test coverage measurement system 102 (e.g., interaction monitoring functionality 112, call graph and code coverage generation functionality 122, and report generation functionality 132) may be provided by the same computing device or by different computing devices. If any of the various components are implemented using different computing devices, then the respective computing devices may be communicatively coupled, e.g., via a network. Each of the interaction monitoring functionality 112, call graph and code coverage generation functionality 122, and report generation functionality 132 may represent any combination of software and hardware usable to perform their respective functions.

In one embodiment, the interaction monitoring functionality 112 may monitor the interactions between the production services 115A and the interactions between test services 115B as described above with respect to FIG. 1. The interaction monitoring functionality 112 may also assist in determining code coverage analysis for the two sets of services, e.g., using instrumentation of the services.

The production services 115A may be implemented using a first set of program code, and the test services 115B may be implemented using a second set of program code. In one embodiment, the call graph and code coverage generation functionality 122 may determine code coverage data 126A for the production services 115A. The code coverage data 126A may indicate which portions of the first set of program code were executed in generating the call graphs 125A. In one embodiment, the code coverage data 126A may also indicate a percentage of the first set of program code executed in the plurality of interactions among the first set of services in the production environment. The call graph and code coverage generation functionality 122 may also determine code coverage data 126B for the test services 115B. The code coverage data 126B may indicate which portions of the second set of program code were executed in generating the call graphs 125B. In one embodiment, the code coverage data 126B may also indicate a percentage of the second set of program code executed in the plurality of interactions among the second set of services in the test environment.

In various embodiments, the report generation functionality 132 may generate a test coverage report 137 indicating various different types of information about the monitored interactions, the call graphs 125A and 125B, the code coverage data 126A and 126B, and any other information indicative of differences between the production environment and the test environment. In one embodiment, by combining code coverage analysis with path coverage analysis, the report 137 may indicate the percentage of code covered (e.g., executed) in production in comparison to the percentage of code covered (e.g., executed) in testing. The report 126 may indicate which code pathways were executed in which scenarios. In this manner, the report 136 may enable better decision-making on behalf of administrators of the tested services.

Tracking Service Requests

Various embodiments of a system and method for tracking service requests may include a framework for tracking a series of requests that propagate through a service-oriented system, such as a system structured according to a service-oriented architecture (SOA). Such a system may include multiple services configured to communicate with each other (e.g., through message passing) to carry out various tasks, such as business process functions. In some embodiments, such services may be loosely coupled in order to minimize (or in some cases eliminate) interdependencies among services. This modularity may enable services to be reused in order to build various applications through a process referred to as orchestration.

Service-oriented systems may be configured to process requests from various internal or external systems, such as client computer systems or computer systems consuming networked-based services (e.g., web services). For instance, an end-user operating a web browser on a client computer system may submit a request for data (e.g., data associated with a product detail page, a shopping cart application, a checkout process, search queries, etc.). In another example, a computer system may submit a request for a web service (e.g., a data storage service, a data query, etc.). In general, services may be configured to perform any of a variety of business processes.

The services described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services.

To process a given received request, the system described herein may invoke one or more of the types of services described above. As used herein, an initial request may be referred to as the "root request." In various embodiments, the root request may but need not originate from a computer system outside of the service-oriented system described herein. In many embodiments, a root request may be processed by an initial service, which may then call one or more other services. Additionally, each of those services may also call one or more other services, and so on until the root request is completely fulfilled. Accordingly, the particular services called to fulfill a request may be represented as a call graph that specifies, for each particular service of multiple services called to fulfill the same root request, the service that called the particular service and any services called by the particular service. For instance, a call graph may in some cases include a deep and broad tree with multiple branches each representing a series of related service calls.

For clarity of description, various terms may be useful for describing elements of a call graph. Note that the following terminology may only be applicable to services and requests of a given call graph. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "request," "call," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that inter-dependencies among source and/or machine code are not present).

As described above, a given parent request may result in multiple child service calls to other services. In various embodiments of the system and method for tracking service requests, request identifiers embedded within such service calls (or located elsewhere) may be utilized to generate a stored representation of a call graph for a given request. In various embodiments, such request identifiers may be stored in log files associated with various services. For instance, a service may store identifiers for inbound requests in an inbound request log and/or store identifiers for outbound requests in an outbound request log. In various embodiments, call graph generation logic may generate a representation of a call graph from identifiers retrieved from such logs. Such representations may be utilized for diagnosing errors with request handling, providing developer support, and performing traffic analysis.

Figure 5:
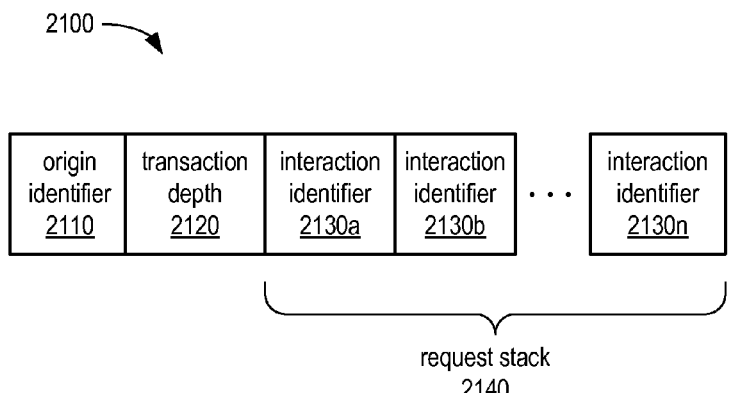
FIG. 5 illustrates an example format of a request identifier, according to some embodiments.

FIG. 5 illustrates an example format for a request identifier 2100 of various embodiments. As described in more detail below, request identifiers of the illustrated format may be passed along with service requests. For instance, a service that calls another service may embed in the call an identifier formatted according to the format illustrated by FIG. 5. For example, a requesting service may embed a request identifier within metadata of a request. In various embodiments, embedding a request identifier in a service request may include embedding within the service request, information that specifies where the request identifier is located (e.g., a pointer or memory address of a location in memory where the request identifier is stored). The various components of the illustrated request identifier format are described in more detail below.

An origin identifier (ID) 2110 may be an identifier assigned to all requests of a given call graph, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In various embodiments, each of such services may be configured to embed the same origin identifier 2110 into a request of (or call to) another service. Accordingly, each of such requests may be associated with each other by virtue of containing the same origin identifier. As described in more detail below, the call graph generation logic of various embodiments may be configured to determine that request identifiers having the same origin identifier are members of the same call graph.

The manner in which the origin identifier may be represented may vary according to various embodiments and implementations. One particular example of an origin identifier may include a hexadecimal string representation of a standard Universally Unique Identifier (UUID) as defined in Request for Comments (RFC) 4122 published by the Internet Engineering Task Force (IETF). In one particular embodiment, the origin identifier may contain only lower-case alphabetic characters in order to enable fast casesensitive comparison of request identifiers (e.g., a comparison performed by the call graph generation logic described below). Note that these particular examples are not intended to limit the implementation of the origin ID. In various embodiments, the origin ID may be generated according to other formats.

Transaction depth 2120 may indicate the depth of a current request within the call graph. For instance (as described above), service "A" may be the initial service called to fulfill a root request (e.g., service "A" may be called by an external system). To fulfill the initial request, service "A" may call service "B," which may call service "C," and so on. In various embodiments, the depth of the initial request may be set to 0. For instance, when the first service or "root" service receives the root service request, the root service (e.g., service "A") may set the transaction depth 120 to 0. If in response to this request the originating service calls one or more other services, the transaction depth for these requests may be incremented by 1. For instance, if service "A" were to call two other services "B1" and "B2," the transaction depth of the request identifiers passed to such services would be equivalent to 1. The transaction depth for request identifiers of corresponding requests sent by B1 and B2 would be incremented to 2 and so on. In the context of a call graph, the transaction depth of a particular request may in various embodiments represent the distance (e.g., number of requests) between that request and the root request. For example, the depth of the root request may be 0, the depth of a request stemming from the root request may be 1, and so on. Note that in various embodiments, such numbering system may be somewhat arbitrary and open to modification.

The manner in which the origin identifier may be represented may vary according to various embodiments and implementations. One particular example of a transaction depth may be represented as a variable-width base-64 number. In various embodiments, the value of a given transaction depth may be but need not be a value equivalent to the increment of the previous transaction depth. For instance, in some embodiments, each transaction depth may be assigned a unique identifier, which may be included in the request identifier instead of the illustrated transaction depth 2120.

Interaction identifiers 2130a-2130n, collectively referred to as interaction identifier(s) 2130, may each identify a single request (or service call) for a given call graph. For instance (as described above), service "A" may be the initial service called to fulfill a request (e.g., service "A" may be called by an external system). To fulfill the root request, service "A" may call service "B," which may call service "C," and so on. In one example, the call of service "B" by service "A" may be identified by interaction identifier 2130a, the call of service "C" by service "B" may be identified by interaction identifier 2130b and so on.

Note that in various embodiments separate service requests between the same services may have separate and unique interaction identifiers. For example, if service "A" calls service "B" three times, each of such calls may be assigned a different interaction identifier. In various embodiments, this characteristic may ensure that the associated request identifiers are also unique across service requests between the same services (since the request identifiers include the interactions identifiers).

Note that in various embodiments the interaction identifier may be but need not be globally unique (e.g., unique with respect to all other interaction identifiers). For instance, in some embodiments, a given interaction identifier for a given request need be unique only with respect to request identifiers having a particular origin identifier 2110 and/or a particular parent interaction identifier, which may be the interaction identifier of the request preceding the given request in the call graph (i.e., the interaction identifier of the request identifier of the parent service). In one example, if service "A" were to call two other services "B1" and "B2," the request identifier of service "B1" and the request identifier of service "B2" would have separate interaction identifiers. Moreover, the parent interaction identifier of each of such interaction identifiers may be the interaction identifier of the request identifier associated with the call of service "A." The relationship between interaction identifiers and parent interaction identifiers is described in more detail below.

In various embodiments, interaction identifiers may be generated randomly or pseudo-randomly. In some cases, the values generated for an interaction identifier may have a high probability of uniqueness within the context of parent interaction and/or a given transaction depth. In some embodiments, the size of the random numbers that need to be generated depends on the number of requests a service makes.

Request stack 2140 may include one or more of the interaction identifiers described above. In various embodiments, the request stack may include the interaction identifier of the request to which the request identifier belongs. In some embodiments, the request stack may also include other interaction identifiers, such as one or more parent interaction identifiers of prior requests (e.g., a "stack" or "history" of previous interaction identifiers in the call graph). In various embodiments, the request stack may have a fixed size. For instance, the request stack 2140 may store a fixed quantity of interaction identifiers including the interaction identifier of the request to which the request identifier belongs and one or more parent interaction identifiers.

In various embodiments, the utilization of a request stack having a fixed length (e.g., fixed quantity of stored interaction identifiers) may provide a mechanism to control storage and bandwidth throughout the service-oriented system. For example, the service-oriented system of various embodiments may in some cases receive numerous (e.g., thousands, millions, or some other quantity) of services requests per a given time period (e.g., per day, per week, or some other time period), such as requests from network-based browsers (e.g., web browsers) on client systems or requests from computer systems consuming network-based services (e.g., web services). In some embodiments, a request identifier adhering to the format of request identifier 2100 may be generated for each of such requests and each of any subsequent child requests. Due to the shear number of requests that may be handled by the service-oriented systems of various embodiments, even when the request stack of a single request identifier is of a relatively small size (e.g., a few bytes), the implications on storage and bandwidth of the overall system may in some cases be significant. Accordingly, various embodiments may include ensuring that each request identifier contains a request stack equal to and/or less than a fixed stack size (e.g., a fixed quantity of interaction identifiers). Similarly, various embodiments may include fixing the length of each interaction identifier stored as part of the request stack (e.g., each interaction identifier could be limited to a single byte, or some other size). By utilizing interaction identifiers of fixed size and/or a request stack of a fixed size, various embodiments may be configured to control the bandwidth and/or storage utilization of the service-oriented system described herein. For instance, in one example, historical request traffic (e.g., the number of requests handled by the service oriented system per a given time period) may be monitored to determine an optimal request stack size and/or interaction identifier size in order to prevent exceeding the bandwidth or storage limitations of the service-oriented system.

In various embodiments, the utilization of a request stack having a fixed length (e.g., fixed quantity of stored interaction identifiers) may provide a mechanism to control one or more fault tolerance requirements of the system including but not limited to durability with respect to data loss and other errors (associated with individual services and host systems as well as the entire service-oriented system). For example, in some embodiments, the larger the size of the request stack (e.g., the more interaction identifiers included within a given request identifier), the more fault tolerant the system becomes.

In embodiments where request stack 2140 includes multiple interaction identifiers, the request stack may serve as a history of interaction identifiers. For instance, in the illustrated embodiment, interaction identifier 2130*a*-2130*n* may represent a series of interaction identifiers in ascending chronological order (where interaction identifier 2130*a* corresponds to the oldest service call and interaction identifier 2130*n* corresponds to the most recent service call).

In addition to the illustrated elements, request identifier 2100 may in various embodiments include one or more portions of data for error detection and/or error correction. Examples of such data include but are not limited to various types of checksums.

Figure 6:
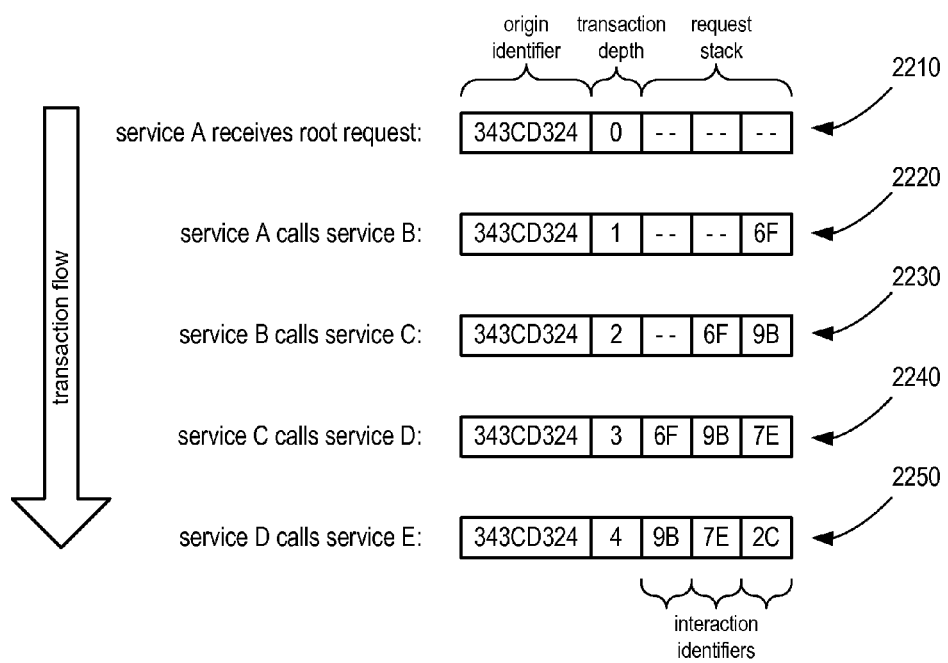
FIG. 6 illustrates an example transaction flow for fulfilling a root request, according to some embodiments.

FIG. 6 illustrates an example transaction flow for a root request and multiple child requests associated with the same root request. As illustrated, the transaction flow may begin with the receipt of a root request by service "A." For instance, this initial request might originate from a client computer system (e.g., from a web browser) or from another computer system requesting a service to consume. To completely fulfill the request, service "A" may perform some quantum of work and/or request the services of another service, such as service "B" (see, e.g., request identifier 2220). Service "B" may call another service "C" (see, e.g., request identifier 2230) and so on as illustrated (see, e.g., request identifiers 2240-2250). As illustrated, since each request identifier 2210-2250 corresponds to a request of the same transaction, each of such request identifiers include the same origin identifier "343CD324." For instance, each of services A-D may embed such origin identifier within each of such request identifiers (described in more detail with respect to FIG. 7). Furthermore, in the illustrated embodiment, the request identifier corresponding to the initial service request includes a transaction depth of 0 since the request identifier is a parent request identifier, as described above. Each subsequent child request identifier includes a transaction identifier equivalent to the previous requests transaction depth plus an increment value. In other embodiments, instead of incremented values, the transaction depths may be values that uniquely identify a transaction depth with respect to other depths of a given call graph; such values may but need not be increments of each other.

In the illustrated example, each request identifier 2210-2250 includes a request stack of a fixed size (e.g., three interaction identifiers). In other embodiments, larger or smaller request stacks may be utilized as long as the request stack includes at least one interaction identifier. Furthermore, in some embodiments, request stack sizes may be of uniform size across the service-oriented system (as is the case in the illustrated embodiment). However, in other embodiments, subsets of services may have different request stack sizes. For instance, a portion of the service-oriented system may utilize a particular fixed stack size for request identifiers whereas another portion of the service-oriented system may utilize another fixed stack fixed stack size for request identifiers.

Figure 7:
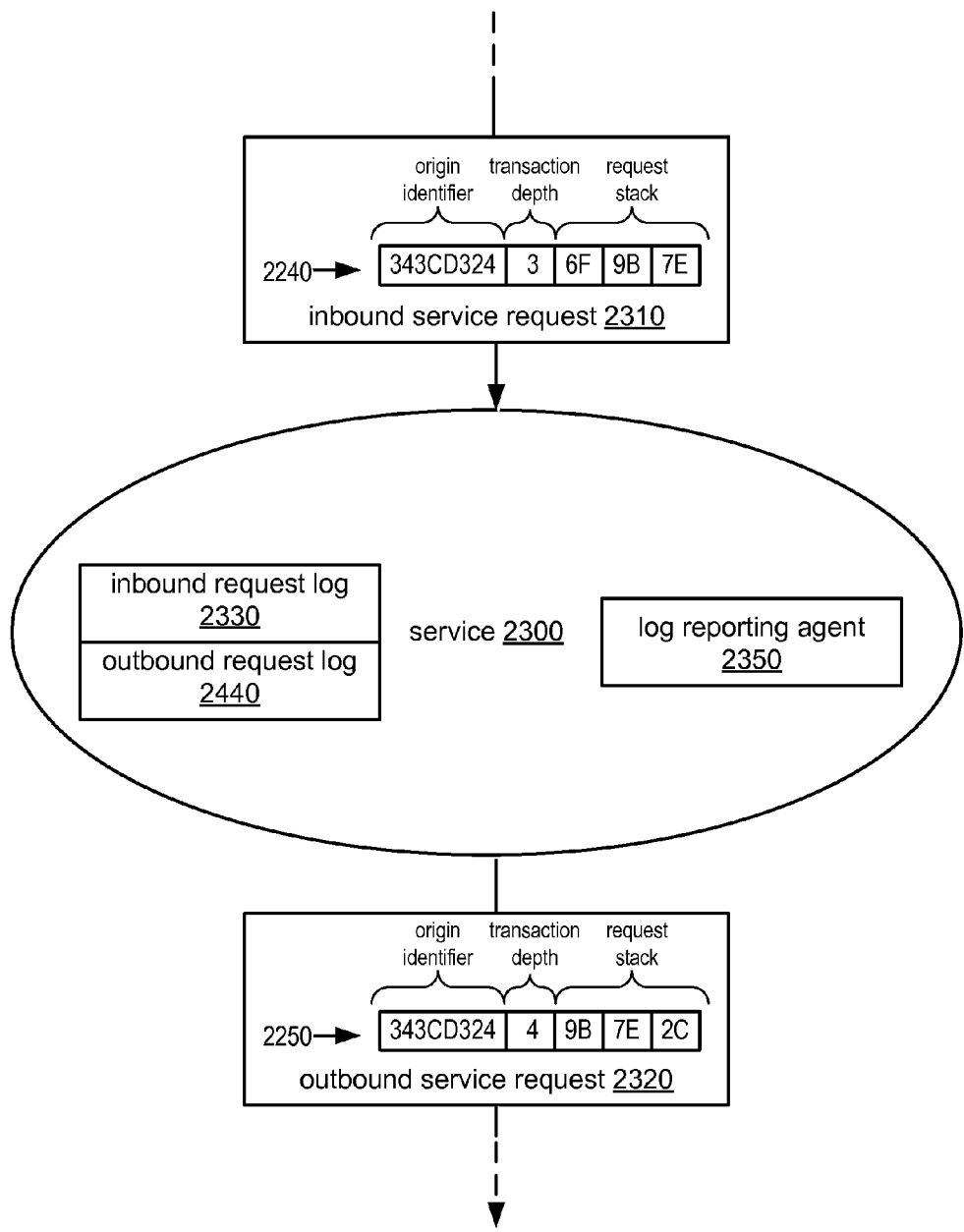
FIG. 7 illustrates one example of a service of a service-oriented system, according to some embodiments.

Referring collectively to FIG. 6 and FIG. 7, a representation of the receipt of an inbound service request (or service call) 2310 as well as the issuance of an outbound request 2320 by service 2300 is illustrated. Request identifiers 2240 and 2250 of FIG. 7 may correspond to the like-numbered elements of FIG. 6. As illustrated, service 2300 may receive an inbound service request 2310. Service 2300 may receive the inbound service request from another service within the service-oriented system, according to various embodiments. Inbound service request 2310 may include the requisite instructions or commands for invoking service 2300. In various embodiments, inbound service request 2310 may also include a request identifier 2240, which may include values for an origin identifier, transaction depth, and request stack, as described above with respect to FIG. 6. In various embodiments, request identifier 2240 may be embedded within inbound service request 2310 (e.g., as metadata). For example, according to various embodiments, the request identifier may be presented as part of metadata in a service framework, as part of a Hypertext Transfer Protocol (HTTP) header, as part of a SOAP header, as part of a Representational State Transfer (REST) protocol, as part of a remote procedural call (RPC), or as part of metadata of some other protocol, whether such protocol is presently known or developed in the future. In other embodiments, request identifier 2240 may be transmitted to service 2300 as an element separate from inbound service request 2310. In various embodiments, request identifier 2240 may be located elsewhere and inbound service request 2310 may include information (e.g., a pointer or memory address) for accessing the request identifier at that location.

In response to receiving the inbound service request, service 2300 may perform a designated function or quantum of work associated with the request, such as processing requests from client computer systems or computer systems requesting web services. In various embodiments, service 2300 may be configured to store a copy of request identifier 2240 within inbound log 2330. In some cases, service 2300 may require the services of another service in order to fulfill a particular request, as illustrated by the transmission of outbound service request 2320.

As is the case in the illustrated embodiment, service 2300 may be configured to send one or more outbound service requests 2320 to one or more other services in order to fulfill the corresponding root request. Such outbound service requests may also include a request identifier 2250 based at least in part on the received request identifier 2240. Request identifier 2250 may be generated by service 2300 or some other component with which service 2300 is configured to coordinate. Since outbound service request 2320 is caused at least in part by inbound service request 2310 (i.e., request 2320 stems from request 2310), the outbound service request 2320 and the inbound service request 2310 can be considered to be constituents of the same call graph. Accordingly, service 2300 (or some other component of the service-oriented framework) may be configured to generate request identifier 2250 such that the request identifier includes the same origin identifier as that of the inbound service request 2310. In the illustrated embodiment, such origin identifier is illustrated as "343CD324." For instance, in one embodiment, service 2300 may be configured to determine the value of the origin identifier of the request identifier of the inbound service request and write that same value into the request identifier of an outbound service request. In various embodiments, service 2300 (or some other component of the service-oriented framework) may also be configured to generate request identifier 2250 such that the request identifier includes a transaction depth value that indicates the transaction depth level is one level deeper than the transaction depth of the parent request (e.g., inbound service request 2310). For instance, in one embodiment, any given call graph may have various depths that each have their own depth identifier. In some embodiments, such depth identifiers may be sequential. Accordingly, in order to generate request identifier 2250 such that it includes a transaction depth value that indicates the transaction depth level is one level deeper than the transaction depth of the parent request (e.g., inbound service request 2310), service 2300 may be configured to determine the value of the transaction depth from the parent request, sum that value with an increment value (e.g., 1, or some other increment value), and store the result of such summation as the transaction depth value of the request identifier of the outbound service request. In the illustrated embodiment, the transaction depth value of the inbound request identifier 2240 is 3 whereas the transaction depth value of the outbound request identifier 2250 is 4.

In some cases, transaction depth identifiers may instead have identifiers that are not necessarily related to each other sequentially. Accordingly, in some embodiments, service 2300 may be configured to determine the transaction depth value from the request identifier of the parent request. From that value, service 2300 may determine the actual depth level corresponding to the transaction depth value (e.g., via a lookup table that provides a sequential listing of transaction depth levels to corresponding transaction depth values). From that depth level, service 2300 may be configured to determine the next sequential transaction depth (e.g., via a lookup table that provides a sequential listing of transaction depth levels to corresponding transaction depth values) as well as the transaction depth value corresponding to that transaction depth. Service 2300 may be configured to store such transaction depth value as the transaction depth value of the request identifier of the outbound service request.

Service 2300 may also be configured to generate request identifier 2250 of the outbound service request such that the request identifier has a request stack that includes an interaction identifier associated with the outbound service request and all of the interaction identifiers of the request stack of request identifier 2240 except for the oldest interaction identifier, which in many cases may also be the interaction identifier corresponding to a request at the highest transaction depth level when compared to the transaction depth levels associated with the other interaction identifiers of the request stack. For example, the root request may occur at transaction depth "0," a subsequent request may occur at transaction depth "1," another subsequent request may occur at transaction depth "2," and so on. In some respects, the request stack may operate in a fashion similar to that of a first in, first out (FIFO) buffer, as described in more detail below.

To generate the request stack of request identifier 2250, service 2300 may be configured to determine the interaction identifiers present within the request stack of request identifier 2240. Service 2300 may also be configured to determine the size of the request stack that is to be included within request identifier 2250 (i.e., the quantity of interaction identifiers to be included within the request stack). In some embodiments, this size may be specified by service 2300, another service within the service-oriented system (e.g., the service that is to receive request 2320), or some other component of the service-oriented system (e.g., a component storing a configuration file that specifies the size). In other embodiments, the size of the request stack may be specified by service 2300. In one embodiment, the size of the request stack may be dynamically determined by service 2300 (or some other component of the service-oriented system). For instance, service 2300 may be configured to dynamically determine the size of the request stack based on capacity and/or utilization of system bandwidth and/or system storage. In one example, service 2300 may be configured to determine that bandwidth utilization has reached a utilization threshold (e.g., a threshold set by an administrator). In response to such determination, service 2300 may be configured to utilize a smaller request stack size in order to conserve bandwidth. In various embodiments, a similar approach may be applied to storage utilization.

Dependent upon the size of the inbound request stack and the determined size of the outbound request stack (as described above), a number of different techniques may be utilized to generate the request stack of request identifier 2250, as described herein. In one scenario, the size of the inbound request stack may be the same as the determined size of the outbound request stack, as is the case in the illustrated embodiment. In this scenario, if the size of the outbound service request stack is to be n interaction identifiers, service 2300 may be configured to determine the (n−1) most recent interaction identifiers of the request stack of the inbound request identifier. Service 2300 may be configured to embed the (n−1) most recent interaction identifiers of the inbound request stack into the request stack of the outbound request identifier 2250 in addition to a new interaction identifier that corresponds to request 2320 issued by service 2300. In the illustrated embodiment, for each request identifier, the oldest interaction identifier is illustrated on the leftmost portion of the request stack and the newest interaction identifier is illustrated on the rightmost portion. In the illustrated embodiment, to generate the request stack of the outbound request identifier, service 300 may be configured to take the request stack of the inbound request identifier, drop the leftmost (e.g., oldest) interaction identifier, shift all other interaction identifiers to the left by one position, insert a newly generated interaction identifier for the outbound request, and embed this newly generated request stack in the request identifier of the outbound request.

In another scenario, the size of the request stack of the inbound service request identifier 2240 may be less than the size of the determined request stack size for the outbound service request identifier 2250. In these cases, the request stack size of the outbound service request may enable all of the interaction identifiers of the request stack of the inbound service request identifier to be included within the request stack of the outbound service request identifier. Accordingly, in various embodiments, service 2300 may be configured to embed all of the interaction identifiers in the request stack of the outbound request identifier 2250 in addition to a new interaction identifier that corresponds to request 2320 issued by service 2300.

In an additional scenario, the size of the request stack of the inbound service request identifier 2240 may be greater than the size of the determined request stack size for the outbound service request identifier 2250. For instance, if the size of the request stack for the outbound service request identifier is m interaction identifiers and the size of the request stack for the inbound request identifier is m+x interaction identifiers (where x and m are positive integers), service 2300 may be configured to determine the (m−1) most recent interaction identifiers of the request stack of the inbound request identifier. Service 2300 may also be configured to embed such (m−1) most recent interaction identifiers of the request stack of the inbound request identifier into the request stack of the outbound request identifier in addition to a new interaction identifier that corresponds to request issued by service 2300.

As described above, inbound request log 2330 may be managed by service 2300 and include records of one or more inbound service requests. In one embodiment, for each inbound service request received, service 2300 may be configured to store that request's identifier (which may include an origin identifier, transaction depth, and request stack, as illustrated) within the inbound request log. In various embodiments, service 2300 may also store within the log various metadata associated with each inbound service request identifier. Such metadata may include but is not limited to timestamps (e.g., a timestamp included within the request, such as a timestamp of when the request was generated, or a timestamp generated upon receiving the request, such as a timestamp of when the request was received by service 2300), the particular quantum of work performed in response to the request, and/or any errors encountered while processing the request. In various embodiments, outbound request log 2340 may include information similar to that of inbound request log 2330. For example, for each outbound request issued, service 2300 may store a record of such request within outbound request log 2340. For instance, service 2300 may, for each outbound request, store that request's identifier within outbound request log 2340. As is the case with inbound request log 2330, service 2300 may also store within outbound request log 2340 various metadata associated with requests including but not limited to metadata such as timestamps and errors encountered.

Figure 8:
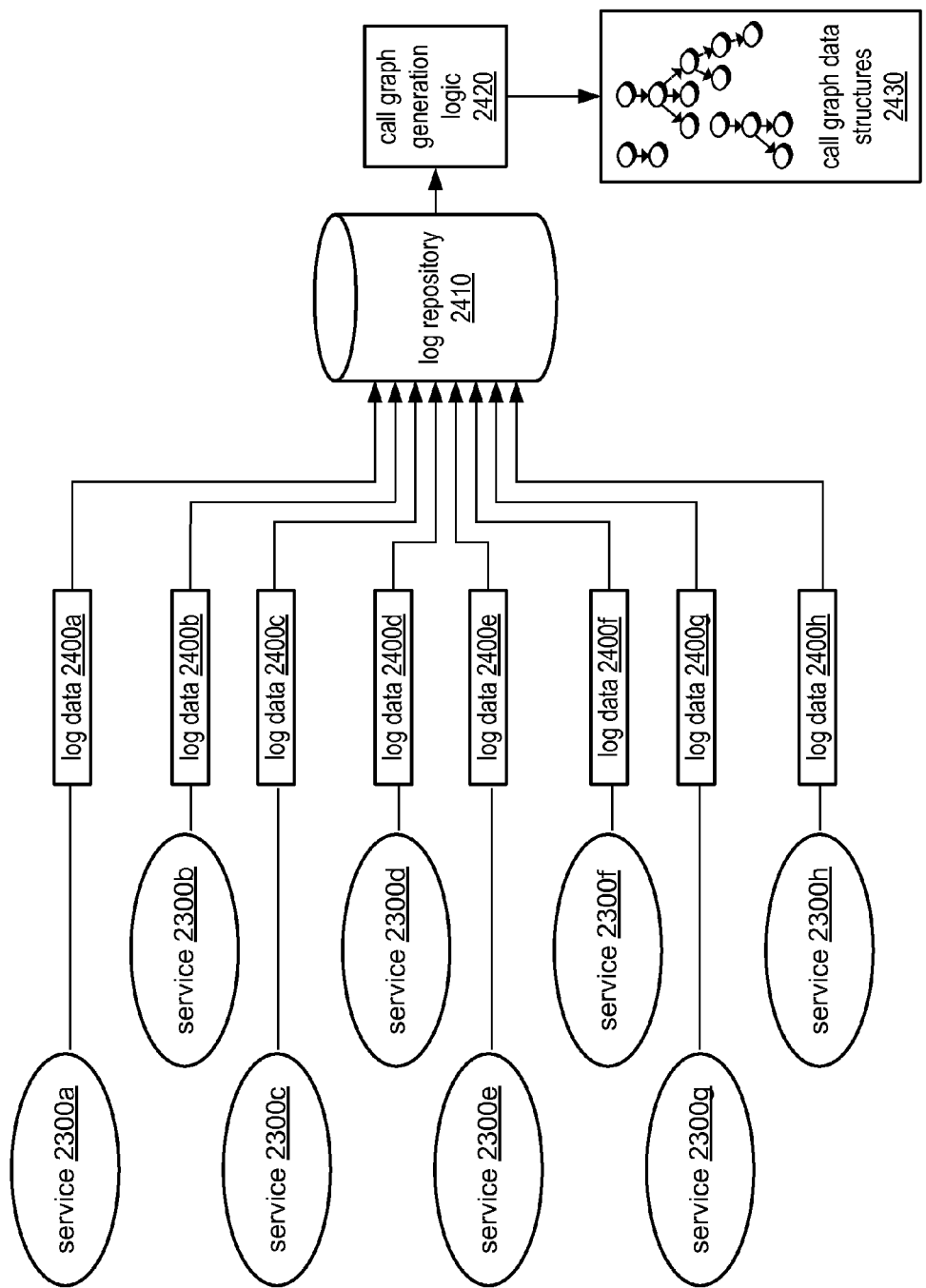
FIG. 8 illustrates an example data flow diagram for the collection of log data and generation of a call graph, according to some embodiments.

Referring collectively to FIG. 7 and FIG. 8, each service within the service-oriented system may include a log reporting agent, such as log reporting agent 2350. Log reporting agent 2350 may in various embodiments report the contents of inbound request log 2330 and/or outbound request log 2340 to a log repository (e.g., a data store, such as a database or other location in memory). One example of such a repository is illustrated log repository 2410 of FIG. 8. Various protocols for transmitting records from the logs of a service 2300 to a log repository may be utilized according to various embodiments. In some embodiments, the log reporting agent may periodically or aperiodically provide log information to the log repository. In various embodiments, the log reporting agent may be configured to service requests for log information, such as a request from the log repository or some other component of the service-oriented system. In some embodiments, in addition to or as an alternative to reporting log information from logs 2330 and 2340, log reporting agent 2350 may report log information to the log repository in real-time (in some cases bypassing the storage of information within the logs altogether). For instance, as a request is detected or generated, the log reporting agent may immediately report the information to the log repository. In various embodiments, log data may specify, for each request identifier, the service that generated the request identifier and/or the service that received the request identifier.

As illustrated in FIG. 8, multiple services 2300a-2300h within the service-oriented system may be configured to transmit respective log data 2400a-2400h to log repository 2410. The data stored within log repository 2410 (e.g., service request identifiers and associated metadata) may be accessed by call graph generation logic 2420. Call graph generation logic may be configured to generate a data structure representing one or more call graphs, such as call graph data structures 2430. As described above, the particular services called to fulfill a root request may be represented as a call graph that specifies, for a particular service called, the service that called the particular service and any services called by the particular service. For instance, since a root request may result in a service call which may propagate into multiple other services calls throughout the service oriented system, a call graph may in some cases include a deep and broad tree with multiple branches each representing a sequences of service calls.

Figure 9:
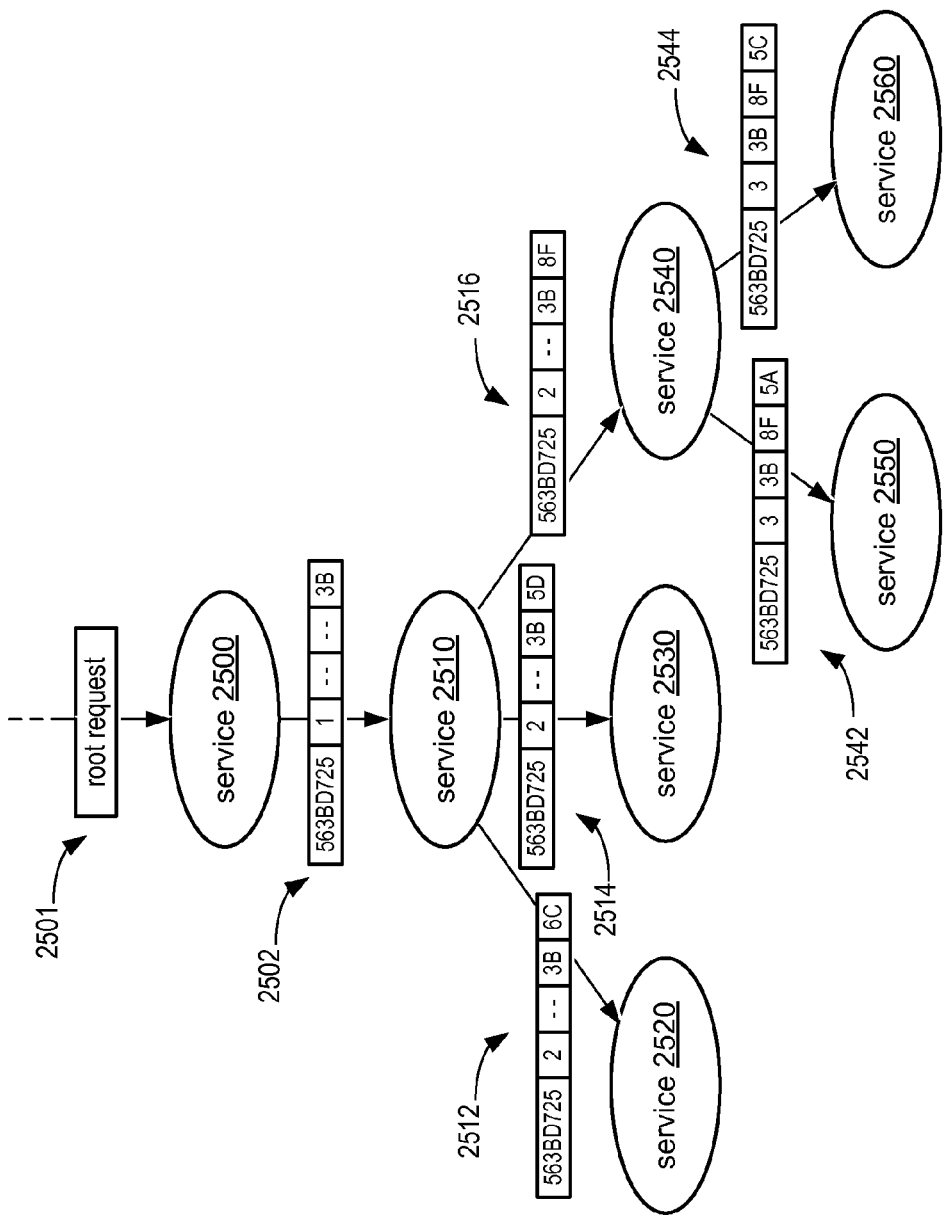
FIG. 9 illustrates an example visual representation of a call graph and request identifiers from which such call graph is generated, according to some embodiments.

FIG. 9 illustrates a visual representation of such a call graph data structure that may be generated by call graph generation logic 2420. In various embodiments, a call graph data structure may include any data structure that specifies, for a given root request, all the services called to fulfill that root request. Note that while FIG. 9 and the associated description pertain to an acyclic call graph, this representation is not inclusive of all variations possible for such a call graph. For instance, in other embodiments, a call graph may be represented by any directed graph (including graphs that include directed cycles) dependent on the nature of the service requests within the service-oriented system. Additionally, for a given one of such services, the call graph data structure may specify the service that called the given service as well as any services called by the given service. The call graph data structure may additionally indicate a hierarchy level of a particular service within a call graph. For instance, in the illustrated embodiment, service 2500 is illustrated as a part of the first level of the hierarchy, service 2510 is illustrated as part of the second level of the hierarchy and so on.

To generate such a call graph, call graph generation logic may be configured to collect request identifiers (e.g., request identifiers 2502, 2512, 2514, 2516, 2542 and 2544) that each include the same origin identifier. In the illustrated embodiment, "563BD725" denotes an example of such an origin identifier. In various embodiments, call graph generation logic may mine (e.g., perform a search or other data analysis) log data associated with various services in order to find a collection of request identifiers that correspond to the same origin identifier (and thus correspond to the same root request, e.g., root request 2501).

In various embodiments, inbound and outbound request logs may be maintained for each service. In these cases, call graph generation logic 2420 may be configured to compare request identifiers in order to determine that a given service called another service in the process of fulfilling the root request. For example, in one embodiment, the call graph generation logic may compare a request identifier from a given service's outbound request log to the request identifier from another service's inbound request log. If a match is detected, the call graph generation logic may indicate that the service corresponding to that outbound request log called the service corresponding to that inbound request log. For example, call graph generation logic may discover a request identifier equivalent to request identifier 2502 within the outbound request log associated with service 2500. In this example, call graph generation logic may also locate a request identifier equivalent to request identifier 2502 within the inbound log of service 2510. In response to this match, call graph generation logic may indicate that an edge (representing a service call) exists between two particular nodes of the call graph (e.g., the node corresponding to service 2500 and the node corresponding to service 2510). The above-described process may be repeated to determine the illustrated edges that correspond to request identifiers 2512, 2514, 2516, 2542 and 2544. In other embodiments, since the manner in which interaction identifiers are generated may ensure that each interaction identifier is unique for a given depth level and origin identifier, the call graph generation logic may instead search for matching interaction identifiers between request identifiers of adjacent depth levels instead of searching for matching request identifiers.

In other embodiments, only one type of log (e.g., either inbound or outbound) may be maintained for a given service. For example, if only outbound request logs are maintained for each of the services, then the call graph generation logic 2420 may utilize different techniques for determining an edge that represents a service call in the call graph data structure. In one example, call graph generation logic may compare two request identifiers that have adjacent depth values. For instance, in the illustrated embodiment, the call graph generation logic may be configured to compare request identifier 2502 to request identifier 2514, since such request identifiers contain the adjacent depth values of 1 and 2. In this case, the call graph generation logic may determine whether the most recent interaction identifier of request identifier 2502 (e.g., 3B) is equivalent to the 2nd most recent interaction identifier of request identifier 2514 (e.g., 3B). For request identifier 2514, the 2nd most recent interaction identifier is evaluated since the most recent interaction identifier position will be fill with a new interaction identifier inserted by the service that generated request identifier 2514 (in this case, service 2530). In the illustrated embodiment, this comparison returns a match since the values for the interaction identifiers are equivalent. In response to such match, the call graph generation logic may be configured to indicate within the data structure that an edge (representing a service call) exists between service 2500 and 2510.

In various embodiments, the call graph generation logic 2420 may be configured to generate a call graph in the presence of data loss. For instance, consider the case where the service oriented system maintains outbound service logs and the log data for service 2510 is lost, as might be the case in the event of a failure on the host system on which service 2510 runs or in the case of a failure of log repository 2410. Since the request identifiers of various embodiments may include a request stack of multiple interaction identifiers, multiple layers of redundancy may be utilized to overcome a log data loss. In this example, since the outbound log data for service 2510 is lost, request identifiers 2512, 2514, and 2516 may not be available. Accordingly, the call graph generation logic may be configured to utilize a request identifier from a lower depth level to reconstruct the pertinent portion of the call graph. While request identifiers 2512, 2514, and 2516 may be not be available due to data loss, the request identifier 2542 (and 2544) is available. Since request identifier 2542 includes a stack or "history" of interaction identifiers, that request identifier may be utilized to obtain information that would have been available if request identifier 2516 were not lost to data failure. Since request identifier 2542 has a depth level that is two levels lower than the depth level of request identifier 2502, the call graph generation logic may utilize the third most recent (not the second most recent as was the case in the previous example) interaction identifier. In this example, the third most recent interaction identifier is evaluated since that position would contain the interaction identifier generated by service 2500 in the illustrated embodiment. If the call graph generation logic determines that the most recent interaction identifier of request identifier 2502 matches the third most recent interaction identifier of request identifier 2542, the call graph generation logic may determine that service 2500 called service 2510 even if the log data for service 2510 is unavailable (e.g., due to data loss). Accordingly, the call graph generation logic may indicate an edge (representing a service call) exists between service 2500 and service 2510 within the generated call graph data structure.

In addition to the request identifiers described above, metadata relating to service interactions may be collected (e.g., by the log reporting agent 2350) and used in the generation of call graphs. In various embodiments, the metadata includes, but is not limited to, any of the following: a timestamp, an indication of whether the interaction is on the client side or server side, the name or other identifier of the application programming interface (API) invoked for the interaction, the host name, data that describes the environment (e.g., a version number of a production environment or test environment), and/or any other metadata that is suitable for building the call graphs and/or comparing one set of call graphs to another. The collected metadata may be used to determine a graph of service interactions, i.e., by identifying or distinguishing nodes and edges from other nodes and edges. The collected metadata may also be used to determine a correspondence between a node or edge in two different graphs (e.g., a production graph and a test graph). If the metadata includes information identifying a test run and/or the version of an environment, then the metadata may enable reporting of test results (e.g., test coverage metrics and/or reports) by test run and/or environment.

In some embodiments, various metadata may also be included within such call graph data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call graph data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a graph structure that indicates which host machines are processing requests (note that in some embodiments host machines may host multiple different services).

The system and method for tracking service requests described herein may be configured to perform a variety of methods. The call graph generation logic described herein may be configured to receive multiple request identifiers, each associated with a respective one of multiple service requests. Each given request identifier may include an origin identifier associated with a root request, a depth value specifying a location of the associated service request within a sequence of service requests, and a request stack including one or more interaction identifiers assigned to a service request issued from one service to another service. For example, receiving multiple request identifiers may in some cases include receiving log data that includes such request identifiers. For instance, the call graph generation logic may receive log data directly from host systems that host the services of the service-oriented system described herein. In some cases, the call graph generation logic may receive log data from one or more log repositories such as log repository 2410 described above. In general, the call graph generation logic may utilize any of the techniques for obtaining request identifiers described above with respect to call graph generation logic 2420.

The call graph generation logic may further, based on multiple ones of the request identifiers that each include an origin identifier associated with a particular root request, generate a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in various embodiments, generating the data structure may include determining that each of a subset of the multiple request identifiers includes the same origin identifier as well as indicating each associated service request as a node of the hierarchy within the data structure. Examples of such nodes are illustrated in FIG. 9 as services 2500, 2510, 2520, 2530, 2540, 2550 and 2560. Generating such data structure may also include, for each node within the hierarchy, assigning the node to a level within the hierarchy based on the transaction depth value of the request identifier associated with the service request corresponding to that node. Examples of such depth level values are described above with respect to transaction depth 2120 of FIG. 5. Generating the data structure may also include determining that the request stack of a given node at a given level within the hierarchy includes an interaction identifier that is the same as an interaction identifier of the request stack of another node located within an adjacent level of the hierarchy. For instance, the call graph generation logic may include any of the various interaction identifier comparison techniques described above with respect to FIGS. 8 and 9. In response to determining such match, the call graph generation logic may indicate a service call as an edge between said given node and said other node. Examples of such an edge are illustrated as the edges coupling the nodes of FIG. 9 described above.

In various embodiments, the techniques for analyzing request identifiers and generating a call graph may be performed on an incremental basis. For example, as request identifiers are updated (e.g., as logs and/or log repositories receive new data), the call graph generation logic described herein may be configured to incrementally update the generated call graph data structure to reflect the newly reported requests. In some embodiments, the techniques described herein may be performed on a depth-level basis. For example, as request identifiers are received (e.g., by the log repository or call graph generation logic described herein), each identifier may be categorized (e.g., placed in a categorized directory) based on transaction depth.

In various embodiments, the generated call graph data structures described herein may be utilized for diagnostic purposes. For instance, as described above, the call graph data structure may include metadata, such as a record of error(s) that occur when processing a request. Because this metadata may be associated with specific nodes and/or service calls, various embodiments may include determining sources of errors or faults within the service-oriented system. In some embodiments, the generated call graph data structures described herein may be utilized for analytical purposes. For example, based on call graph data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call graph data structures described herein may be utilized for auditing purposes. For example, in the case that the service oriented system provides network-based services (e.g., web services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call graph data structures described herein.

In one embodiment, the call graph generation logic may receive a first request identifier associated with an inbound service request. The request identifier may include an origin identifier associated with a root request, a depth value specifying a location of the inbound service request within a sequence of service requests, and a request stack including multiple interaction identifiers each assigned to a respective service request issued from one service to another service of multiple services. One example of receiving such a request identifier is illustrated in FIG. 7 as the receipt of inbound service request identifier 2240 by service 2300.

The call graph generation logic may also generate a new request stack. The new request stack may include all of the interaction identifiers of the first request identifier except for an oldest one of the interaction identifiers. For instance, as illustrated in FIG. 7, the request stack of outbound request identifier 2250 does not include "6F," which is the oldest interaction identifier of the inbound service request identifier 2240. The new request stack may also include a new interaction identifier associated with an outbound service request. For instance, as illustrated in FIG. 7, the request stack of outbound service request identifier 2250 includes a new interaction identifier "2C."

The call graph generation logic may also generate a second request identifier associated with the outbound service request. The second request identifier may include the origin identifier, a new depth value specifying a location of the outbound service request within the sequence of service requests, and the new request stack. One example of such a second request identifier is illustrated as outbound service request identifier 2250 of FIG. 7.

In various embodiments, the call graph generation logic may also generate the new depth value such that the new depth value is a result of incrementing the first depth value. For example, in the illustrated embodiment of FIG. 7, the depth value of the outbound request identifier (i.e., "4") may be the result of incrementing the depth value of the inbound request identifier (i.e., "3"). In various embodiments, the call graph generation logic may store either of (or both of) the first request identifier and the second request identifier as log data accessible to one or more computer systems. For instance, in the illustrated embodiment of FIG. 7, the inbound and outbound request identifiers may be stored in inbound request log 2330 and outbound request log 2340, respectively.

Figure 10:
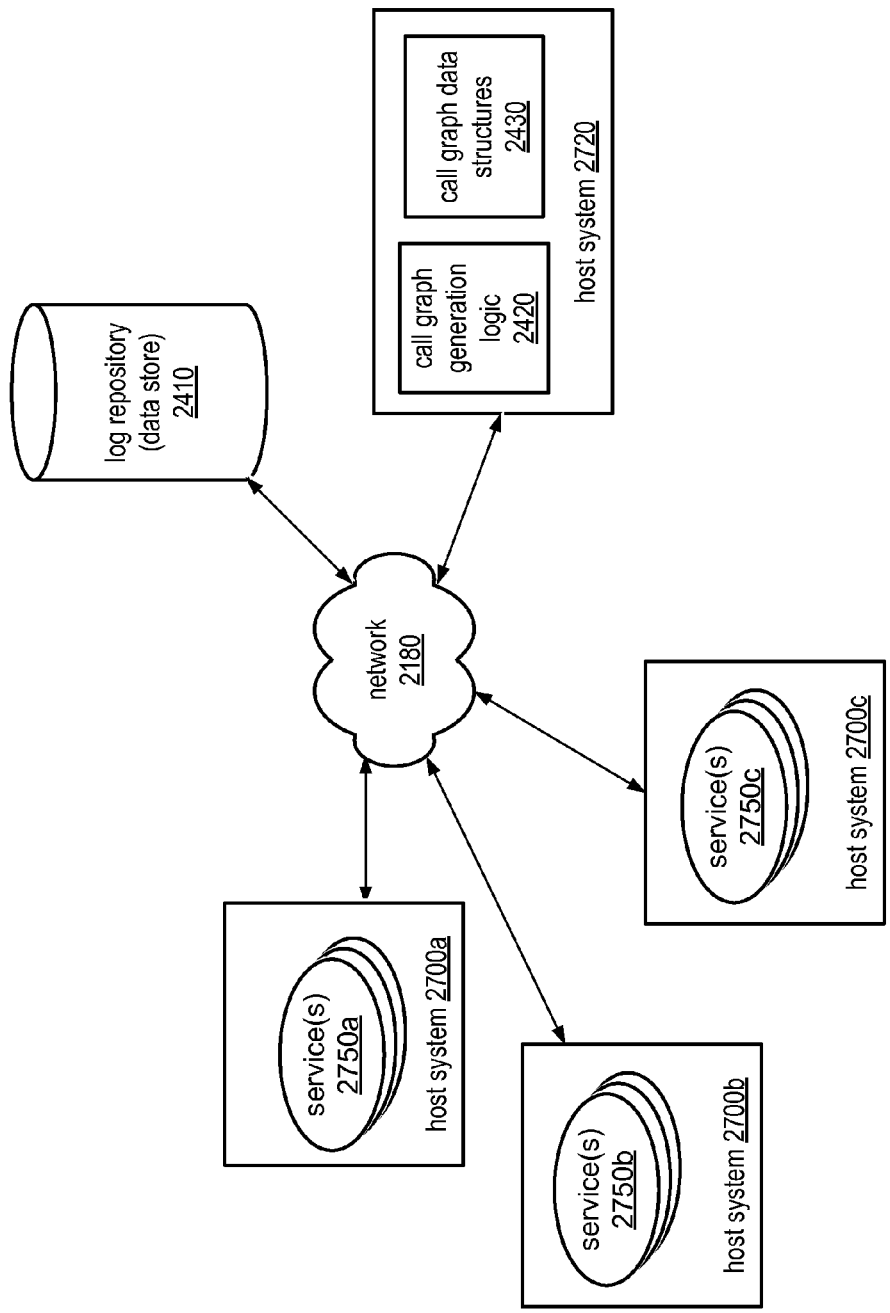
FIG. 10 illustrates an example system configuration for tracking service requests, according to some embodiments.

One example system configuration for tracking service requests is illustrated in FIG. 10. As illustrated, the various components of the example system are coupled together via a network 2180. Network 2180 may include any combination of local area networks (LANs), wide area networks (WANs), some other network configured to communicate data to/from computer systems, or some combination thereof. Each of host systems 2700*a-c* and 2720 may be implemented by a computer system, such as computer system 3000 described below. Call graph generation logic 2420 may be implemented as software (e.g., program instructions executable by a processor of host system 2720), hardware, or some combination thereof. Call graph data structures 2430 may be generated by host system logic 420 and stored in a memory of host system 2720. Log repository 2410 may be implemented as a data store (e.g., database, memory, or some other element configured to store data) coupled to network 2180. In other embodiments, log repository 2410 may be implemented as a backend system of host system 2720 and accessible to host system 2720 via a separate network. Host system 2700*a* may be configured to execute program instruction to implement one or more services 2750*a*. Such services may include but are not limited to one or more of network-based services (e.g., a web service), applications, functions, objects, methods (e.g., objected-oriented methods), subroutines, or any other set of computer-executable instructions. Examples of services 2750 include any of the services described above. Host systems 2700*b-c* and services 2750*b-c* may be configured in a similar manner.

In various embodiments, the various services of the illustrated embodiment may be controlled by a common entity. However, in some embodiments, external systems, such as a system controlled by another entity, may be called as part of a sequence of requests for fulfilling a root request. In some cases, the external system may adhere to the request identifier generation techniques described herein and may integrate with the various services described above. In the event that an external system does not adhere to the various techniques for generating request identifiers as described herein, the external system may be treated as a service that is not visible in the call graph or, alternatively, requests sent back from the external system may be treated as new requests altogether (e.g., as root requests). In various embodiments, the system configuration may include one or more proxy systems and/or load balancing systems. In some cases, the system configuration may treat these systems as transparent from a request identifier generation perspective. In other cases, these systems may generate request identifiers according to the techniques described above.

In some embodiments, the service-oriented system described herein may be integrated with other external systems that may utilize different techniques for identifying requests. For instance, the request identifiers described herein may in various embodiments be wrapped or enveloped in additional data (e.g., additional identifiers, headers, etc.) to facilitate compatibility with various external systems.

Illustrative Computer System

In at least some embodiments, a computer system that implements a portion or all of one or more of the technologies described herein may include a general-purpose computer system that includes or is configured to access one or more computer-readable media. FIG. 11 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computer processors; and
system memory storing program instructions, wherein the system memory is coupled to at least one of the one or more computer processors, and when executed by the at least one of the one or more computer processors, the program instructions cause the one or more computer processors to:
monitor a plurality of interactions among a first set of services in a production environment, wherein the first set of services comprises a first set of program code;
determine a first set of call graphs based on the plurality of interactions among the first set of services in the production environment,
wherein the first set of call graphs comprises a plurality of call paths between individual ones of the first set of services in the production environment;
determine code coverage data indicating an amount of the first set of program code executed by the first set of services in generating the first set of call graphs;
monitor a second plurality of interactions among a second set of services in a test environment, wherein the second set of services are based, at least in part, on the first set of services;
determine a second set of call graphs based on the second plurality of interactions among the second set of services in the test environment, wherein the second set of call graphs comprises a second plurality of call paths between individual ones of the second set of services in the test environment;
perform a comparison between the second set of call graphs and the first set of call graphs;
determine a test coverage metric based on the comparison, wherein the test coverage metric indicates a percentage of the call paths in the first set of call graphs that have corresponding call paths in the second set of call graphs; and generate a code coverage report comprising the test coverage metric and the code coverage data indicating the amount of the first set of program code executed in generating the first set of call graphs.

2. The system as recited in claim 1, wherein the first set of call graphs comprises a first plurality of clusters, wherein the second set of call graphs comprises a second plurality of clusters, wherein each of the clusters comprises a plurality of related call paths, and wherein the test coverage metric indicates a percentage of the clusters in the first set of call graphs that have corresponding clusters in the second set of call graphs.

3. The system as recited in claim 1, wherein the program instructions are further executable to:

for each call path of the plurality of call paths in the production environment, determine a respective probability of the call path of the plurality of call paths occurring;

for each call path of the second plurality of call paths in the test environment, determine a respective probability of the call path of the second plurality of call paths occurring; and include within the code coverage report an indication of a difference between the respective probability of one of the call paths occurring in the production environment and the respective probability of a corresponding one of the call paths occurring in the test environment.

4. The system as recited in claim 1, wherein the second set of services comprises a second set of program code, and wherein the program instructions are further executable to:

determine a percentage of the first set of program code executed in the plurality of interactions among the first set of services in the production environment;

determine a percentage of the second set of program code executed in the plurality of interactions among the second set of services in the test environment; and include within the code coverage report an indication of a comparison between the percentage of the first set of program code executed and the percentage of the second set of program code executed.

5. A computer-implemented method, comprising:

determining a first set of interactions among a first set of services, wherein the first set of interactions comprises a plurality of calls between individual ones of the first set of services, wherein the first set of services comprises a first set of program code;

determining an amount of the first set of program code executed in the first set of interactions among the first set of services;

determining a second set of interactions among a second set of services, wherein the second set of interactions comprises a second plurality of calls between individual ones of the second set of services;

generating a test coverage metric, wherein the test coverage metric indicates an amount of the first set of interactions that are covered by the second set of interactions; and generating a test coverage report comprising the test coverage metric and the amount of the first set of program code executed in the first set of interactions among the first set of services.

6. The method as recited in claim 5, further comprising: including within the test coverage report an indication of at least one frequency distribution relating to the first set of interactions, the second set of interactions, or the first and second set of interactions.

7. The method as recited in claim 5, wherein said determining the first set of interactions among the first set of services comprises tracking a plurality of service requests using a respective reporting agent for each of the first set of services, and wherein said determining the second set of interactions among the second set of services comprises tracking a plurality of service requests using a respective reporting agent for each of the second set of services.

8. The method as recited in claim 5, wherein the first set of interactions are clustered into a first plurality of scenarios, wherein the second set of interactions are clustered into a second plurality of scenarios, wherein each of the scenarios comprises a plurality of related call paths, and wherein the test coverage metric indicates a percentage of the scenarios in the first set of interactions that have corresponding scenarios in the second set of interactions.

9. The method as recited in claim 5, further comprising:

for each of the first set of interactions, determining a respective probability of the interaction occurring;

for each of the second set of interactions, determining a respective probability of the interaction occurring; and including with the test coverage report an indication of a difference between the respective probability of one of the interactions occurring among the first set of services and the respective probability of a corresponding one of the interactions occurring among the second set of services.

10. The method as recited in claim 5, wherein the second set of services comprises a second set of program code, and wherein the method further comprises:

determining an amount of the second set of program code executed in the second set of interactions among the second set of services; and including with the test coverage report an indication of a comparison between a percentage of the first set of program code executed and a percentage of the second set of program code executed.

11. A non-transitory, computer-readable storage medium storing program instructions computer-executable to perform:

determining a first plurality of call paths among a plurality of production services, wherein each of the first plurality of call paths represents one or more service interactions between individual ones of the plurality of production services, wherein the plurality of production services comprises a first set of program code;

determining an amount of the first set of program code executed in the plurality of production services in generating the first plurality of call paths;

determining a second plurality of call paths among a plurality of test services, wherein each of the second plurality of call paths represents one or more service interactions between individual ones of the plurality of test services, wherein the plurality of test services are based, at least in part, on the plurality of production services;

generating a test coverage metric, wherein the test coverage metric indicates a percentage of the first plurality of call paths that have corresponding call paths in the second plurality of call paths; and generating a test coverage report comprising the test coverage metric and the amount of the first set of program code executed in the plurality of production services in generating the first plurality of call paths.

12. The non-transitory, computer-readable storage medium as recited in claim 11, wherein said determining the first plurality of call paths among the plurality of production services comprises monitoring the service interactions using a respective reporting agent for each of the plurality of production services, and wherein said determining the second plurality of call paths among the plurality of test services comprises monitoring the service interactions using a respective reporting agent for each of the plurality of test services.

13. The non-transitory, computer-readable storage medium as recited in claim 11, wherein the first plurality of call paths are clustered into a first plurality of scenarios, wherein the second plurality of call paths are clustered into a second plurality of scenarios, and wherein the test coverage metric indicates a percentage of the first plurality of scenarios that have corresponding scenarios in the second plurality of scenarios.

14. The non-transitory, computer-readable storage medium as recited in claim 11, wherein the program instructions are computer-executable to perform:
 for each call path of the first plurality of call paths, determining a respective probability of the call path of the first plurality of call paths occurring;
 for each call path of the second plurality of call paths, determining a respective probability of the call path of the second plurality of call paths occurring; and
 generating a report indicating a difference between the respective probability of one of the first plurality of call paths occurring among the plurality of production services and the respective probability of a corresponding one of the second plurality of call paths occurring among the plurality of test services.

15. The non-transitory, computer-readable storage medium as recited in claim 11, wherein the plurality of test services comprises a second set of program code, and wherein the program instructions are computer-executable to perform:
 determining an amount of the second set of program code executed in the second plurality of call paths among the plurality of test services; and
 including within the test coverage report an indication of a comparison between a percentage of the first set of program code executed and a percentage of the second set of program code executed.

16. A system, comprising:
 at least one processor; and
 a memory coupled to the at least one processor, wherein the memory stores program instructions, wherein the program instructions are executable by the at least one processor to:
  determine a first set of call graphs for a first set of services, wherein the first set of call graphs comprises a plurality of service requests among the first set of services over a first period of time, and wherein the first set of services comprises a first set of program code;
  determine an amount of the first set of program code executed by the first set of services over the first period of time;
  determine a second set of call graphs for a second set of services, wherein the second set of call graphs comprises a second plurality of service requests among the second set of services over a second period of time, and wherein the second set of services are based, at least in part, on the first set of services;
  generate a coverage report, wherein the coverage report comprises data indicative of coverage of the first set of call graphs by the second set of call graphs, and wherein the coverage reports comprises the amount of the first set of program code executed by the first set of services over the first period of time.

17. The system as recited in claim 16, wherein, in said determining the first set of call graphs, the program instructions are further executable by the at least one processor to monitor the plurality of service requests among the first set of services using a plurality of reporting agents for the first set of services, and wherein, in said determining the second set of call graphs, the program instructions are further executable by the at least one processor to monitor the second plurality of service requests among the second set of services using a second plurality of reporting agents for the second set of services.

18. The system as recited in claim 16, wherein the first set of call graphs comprises a first plurality of scenario clusters, wherein the second set of call graphs comprises a second plurality of scenario clusters, and wherein the coverage report indicates a percentage of the first plurality of scenario clusters that have corresponding scenarios in the second plurality of scenario clusters.

19. The system as recited in claim 16, wherein the program instructions are further executable by the at least one processor to:
 for each service request of the plurality of service requests in the first set of call graphs, determine a respective probability of the service request of the plurality of service requests occurring; and
 for each service request of the second plurality of service requests in the second set of call graphs, determine a respective probability of the service request of the second plurality of service requests occurring;
 wherein the coverage report indicates a difference between the respective probability of one of the plurality of service requests occurring among the first set of services and the respective probability of a corresponding one of the second plurality of service requests occurring among the second set of services.

20. The system as recited in claim 16, wherein the second set of services comprises a second set of program code, and wherein the program instructions are further executable by the at least one processor to:
 determine an amount of the second set of program code executed for the second set of services over the second period of time;
 wherein the coverage report indicates a comparison between a percentage of the first set of program code executed and a percentage of the second set of program code executed.

21. The system as recited in claim 16, wherein the first set of service requests are duplicated to generate the second set of service requests.

* * * * *